US007526568B1

(12) United States Patent
Swanton et al.

(10) Patent No.: US 7,526,568 B1
(45) Date of Patent: Apr. 28, 2009

(54) INTEGRATED LIVE VIDEO PRODUCTION SYSTEM

(75) Inventors: John B. Swanton, Westport Island, ME (US); Kenneth Swanton, Bolton, MA (US); Russell Whittaker, Brookline, MA (US)

(73) Assignee: Broadcast Pix, Inc., Billerica, MA (US)

( * ) Notice: Subject to any disclaimer, the term of this patent is extended or adjusted under 35 U.S.C. 154(b) by 1102 days.

(21) Appl. No.: 10/783,944

(22) Filed: Feb. 20, 2004

(51) Int. Cl.
G06F 15/173 (2006.01)
G06F 11/00 (2006.01)
G06F 3/00 (2006.01)
G06F 13/00 (2006.01)
G05B 11/01 (2006.01)
G05B 15/00 (2006.01)
G05B 9/02 (2006.01)
H04N 5/445 (2006.01)
H04N 5/232 (2006.01)
H04J 1/16 (2006.01)
H04J 3/18 (2006.01)
G08C 15/00 (2006.01)
H04L 12/28 (2006.01)

(52) U.S. Cl. .......... 709/239; 709/224; 700/17; 700/19; 700/20; 700/82; 700/83; 702/188; 714/2; 714/46; 714/47; 714/57; 725/37; 348/211.1; 348/211.4; 370/217; 370/221; 370/228

(58) Field of Classification Search .......... 700/17, 700/19–21, 79, 82, 83; 702/188; 709/217, 709/220, 223, 224, 208, 238, 239; 710/100, 710/104, 305, 316; 714/100, 1–4, 57, 25, 714/37, 46–48; 725/37; 348/180, 207.99, 348/211.99, 211.1, 211.3, 211.4; 370/216–218, 370/221, 225, 228
See application file for complete search history.

(56) References Cited

U.S. PATENT DOCUMENTS 6,061,809 A * 5/2000 Glaser et al. .......... 714/11
6,392,990 B1 * 5/2002 Tosey et al. .......... 370/218

(Continued)

FOREIGN PATENT DOCUMENTS

JP 11308303 A * 11/1999

(Continued)

OTHER PUBLICATIONS

GlobalStreams™ Teams with Electric Image for New 3D Software Suite, www.globalstreams.com/about_us/pr/, St. Louis, MO—Apr. 22, 2003.

(Continued)

Primary Examiner—Crystal J Barnes Bullock
(74) Attorney, Agent, or Firm—Muirhead and Saturnelli, LLC

(57) ABSTRACT

Described is a system used in defining and producing a live television broadcast. The system includes one or more control panels, a workstation, a router, and devices. The control panels may be hard control panels or soft control panels. The control panel includes programmable buttons having a display determined in accordance with a show definition. Display and control of a portion of the control panel buttons may vary in response to another control or button selection. Primary and backup communication connections are used to control the live show production.

28 Claims, 24 Drawing Sheets

U.S. PATENT DOCUMENTS

| | | | |
|---|---|---|---|
| 6,496,948 B1 * | 12/2002 | Smorodinsky | 714/37 |
| 6,591,150 B1 * | 7/2003 | Shirota | 700/82 |
| 6,728,601 B2 | 4/2004 | Garcia et al. | 700/286 |
| 6,763,479 B1 * | 7/2004 | Hebert | 714/4 |
| 7,058,482 B2 * | 6/2006 | Fletcher et al. | 700/292 |
| 7,069,473 B2 * | 6/2006 | Yasuda | 714/37 |
| 7,219,149 B2 * | 5/2007 | Ofir et al. | 709/224 |
| 7,222,256 B2 * | 5/2007 | Pickell | 714/4 |
| 7,266,715 B1 * | 9/2007 | Bazzinotti et al. | 714/4 |
| 7,302,320 B2 * | 11/2007 | Nasr et al. | 701/22 |
| 2002/0174187 A1 * | 11/2002 | Kollar et al. | 709/208 |
| 2004/0054623 A1 * | 3/2004 | Collins et al. | 705/39 |
| 2004/0190685 A1 * | 9/2004 | Davies | 379/9.05 |
| 2005/0273207 A1 * | 12/2005 | Dougherty | 700/292 |

FOREIGN PATENT DOCUMENTS

| | | | |
|---|---|---|---|
| JP | 2003162455 A | * | 6/2003 |

OTHER PUBLICATIONS

GlobalStreams™ Customers Tout Versatility of GlobeCaster Studio, www.globalstreams.com/about_us/pr/, St. Louis, MO—Apr. 8, 2003.
GlobalStreams™ Builds on Proven Broadcast Technology Platform at NAB, www.globalstreams.com/about_us/pr/, St. Louis, MO—Apr. 8, 2003.
PSNI Selects GlobalStreams™ to be Part of Elite Network of A/V Systems Integrators, www.globalstreams.com/about_us/pr/, St. Louis, MO —Apr. 8, 2003.
GlobalStreams™ Announces New Upgrade Program for Trinity Users, www.globalstreams.com/about_us/pr/, St. Louis, MO—Apr. 8, 2003.
GlobalStreams™ Expands Distribution Reach, www.globalstreams.com/about_us/pr/, St. Louis, MO—Jan. 30, 2002.
Merv Griffin Productions Brings Value to Clients with Globecaster™, www.globalstreams.com/about_us/pr/, Los Angeles, CA—Nov. 4, 2001.
NFL Films Chooses GlobalStreams™ Technology to Produce Original Programs for the Web, www.globalstreams.com/about_us/pr/, Camden, NJ—Oct. 4, 2001.
GlobalStreams™ Announces Intent to Tightly Integrate Globecaster™ with RealNetworks®' RealOne™, www.globalstreams.com/about_us/pr/, Real™ Conference 2001, Seattle—Sep. 24, 2001.
GlobalStreams™ Ships New All-in-One Broadcasting Solutions, www.globalstreams.com/about_us/pr/, St. Louis, MO (Jun. 1, 2001).
GlobalStreams™ Showcases New Globecaster™ Broadcasting Solutions Line in Booth #L6426 at NAB2001, www.globalstreams.com/about_us/pr/, Las Vegas, NV—Apr. 22, 2001.
Sanjay Talwani, GlobeCaster Controls the Control Room, Copyright 2002 IMAS Publishing (USA), Inc., reprinted from Feb. 20, 2002-TV Technology, www.tvtechnology.com.
DCTV Uses GlobeCaster to Produce and Deliver Weekly Live Cable and Internet Broadcast Performances, New York—Jun. 18, 2001.
Global Streams Ships New All-in-one Broadcasting Solutions, St. Louis, MO—Jun. 4, 2001.
Stream Big: NFL Films bites on first-ever Super Bowl pregame Webcast by Karen Brown, from the Feb. 5, 2001 issue of *Broadband Week*.
Trinity—All Grown Up? The Toast of NAB Past Enjoys Continued Success as Globecaster, by Susan Thomas, Videography—May 2003—www.Videography.com.
About GlobalStreams, © 2001-2002 GlobalStreams, Inc.
The Most Versatile Solution for Live and Post Production, © 2001-2002 GlobalStreams, Inc., www.globalstreams.com/.
GlobeCaster™ 2.9.1 Software, © 2001-2003 GlobalStreams, Inc.
New content package offers time-saving still stores, digital FX and more! © 2001-2002 GlobalStreams, Inc., www.globalstreams.com/products/content/religious.html.
Hard Surface Control Switcher Available Now! © 2001-2002 GlobalStreams, Inc., www.globalstreams.com/products/cs-1000/.
Breakthrough, Award-Winning Technology, © 2001-2002 GlobalStreams, Inc., www.globalstreams.com/products/.
GlobeCaster Studio 4000™ Features, © 2001-2002 GlobalStreams, Inc., www.globalstreams.com/products/4000.
GlobeCaster Studio 4000™ Product Demos, © 2001-2002 GlobalStreams, Inc., www.globalstreams.com/products/4000/demos.html.
GlobalStreams™ Solutions, © 2001-2002 GlobalStreams, Inc., www.globalstreams.com/solutions/.
Success Stories, © 2001-2002 GlobalStreams, Inc., www.globalstreams.com/solutions/case_studies/.
GlobeCaster Studio 8000™ Features, © 2001-2002 GlobalStreams, Inc., www.globalstreams.com/products/8000/.
GlobeCaster 8000™ Product Demos, © 2001-2002 GlobalStreams, Inc., www.globalstreams.com/products/8000/demos.html.
GlobeCaster ACE Seat License™, © 2001-2002 GlobalStreams, Inc., www.globalstreams.com/products/license.
Product SKUs (Call for US and International Pricing), © 2001-2002 GlobalStreams, Inc., www.globalstreams.com/products/list/.
Ross Cool Practical Technology™ -Digital Production Switchers—Synergy 100 SD, © 1974-2003 Ross Video Limited, www.rossvideo.com/synergy/synergy100sd_overview.html.
Ross Cool Practical Technology™ -Press Releases: The Synergy 100 Ships Right on Schedule, Iroquois, Ontario—May, 2002, www.rossvideo.com/news/synergy100ships.html.
NewTek—VT[3]™ Integrated Production Suite System Requirements, © 2004 NewTek, www.newtek.com/products/vt/info/sys-req.html.
NewTek—Community & Government Access VT[3], © 2004 NewTek, www.newtek.com/solutions/peg.index.php.
NewTek—VT[3] Integrated Production Suite, © 1990-2003 NewTek, Inc., www.newtek.com/education/index.php.
NewTek Live Production, © 2004 NewTek, www.newtek.com/solutions/live-production.html.
NewTek VT[3]™ Integrated Production Suite—Now Shipping, © 2004 NewTek, www.newtek.com/products/vt/info/index.html.
NewTek VT[3]™ Integrated Production Suite—NewTek [V3] Suggested Retail Price List, © 2004 NewTek, www.newtek.com/products/vt/info/pricing.html.
NewTek VT[3]™ Integrated Production Suite—Key Feaures, © 2004 NewTek, www.newtek.com/products/vt/info/key-features.html.
NewTek VT[3]™ Integrated Production Suite—New Features in VT[3], © 2004 NewTek, www.newtek.com/products/vt/info/new-features..html.
NewTek VT[3]™ Integrated Production Suite—VT-Edit, © 2004 NewTek, www.newtek.com/products/vt/info/vt-edit.html.
NewTek VT[3]™ Integrated Production Suite—Switcher, © 2004 NewTek, www.newtek.com/products/vt/info/switcher.html.
NewTek VT[3]™ Integrated Production Suite—VT-Scope, © 2004 NewTek, www.newtek.com.products/vt/info/vt-scope.html.
NewTek VT[3]™ Integrated Production Suite—Proc-Amp, © 2004 NewTek, www.newtek.com/products/vt/info/proc-amp.html.
NewTek VT[3]™ Integrated Production Suite—Character Generator, © 2004 NewTek, www.newtek.com/products/vt/info/character-gen.html.
NewTek VT[3]™ Integrated Production Suite—Aura 2—VT Paint, © 2004 NewTek, www.newtek.com/products/vt/info/aura-vt-paint.html.
NewTek VT[3]™ Integrated Production Suite—LightWave 3D®, © 2004 NewTek, www.newtek.com/products/vt/info/lightwave.html.
NewTek VT[3]™ Integrated Production Suite—File Bin, © 2004 NewTek, www.newtek.com/products/vt/info/file-bin.html.
NewTek VT[3]™ Integrated Production Suite—Keyers, © 2004 NewTek, www.newtek.com/products/vt/info/keyers.html.
NewTek VT[3]™ Integrated Production Suite—VT-Vision, © 2004 NewTek, www.newtek.com/products/vt/info/vt-vision.html.
NewTek VT[3]™ Integrated Production Suite—DDR, © 2004 NewTek, www.newtek.com/products/vt/info/ddr.html.

NewTek VT[3]™ Integrated Production Suite—Batch Capture, © 2004 NewTek, www.newtek.com/products/vt/info/batch-capture.html.

NewTek VT[3]™ Integrated Production Suite—Capture Panel, © 2004 NewTek, www.newtek.com/products/vt/info/capture-panel.html.

NewTek VT[3]™ Integrated Production Suite—Audio Mixer, © 2004 NewTek, www.newtek.com/products/vt/info/audio-mixer.html.

NewTek VT[3]™ Integrated Production Suite—Deck Control, © 2004 NewTek, www.newtek.com/products/vt/info/deck-control.html.

NewTek VT[3]™ Integrated Production Suite—Background Generator, © 2004 NewTek, www.newtek.com/products/vt/info/background-gen.html.

NewTek VT[3]™ Integrated Production Suite—SX-8, © 2004 NewTek, www.newtek.com/products/vt/info/sx-8.html.

NewTek VT[3]™ Integrated Production Suite—RS-8, © 2004 NewTek, www.newtek.com/products/vt/info/rs-8.html.

NewTek VT[3]™ Integrated Production Suite—Genlock, © 2004 NewTek, www.newtek.com/products/vt/info/genlock.html.

NewTek VT[3]™ Integrated Production Suite—Serial Digital Interface (SDI), © 2004 NewTek, www.newtek.com/products/vt/info/sdi.html.

NewTek VT[3]™ Integrated Production Suite—System Requirements, © 2004 NewTek, www.newtek.com/products/vt/info/sys-req.html.

NewTek Press Releases, © NewTek, www.newtek.com/news/releases/index.html.

NewTek Announces Live Production Solution for Education at Student Television Network Conference, Los Angeles, CA—Jan. 8, 2004, www.newtek.com/news/releases/01-08-04a.html.

NewTek Sponsors Alliance for Community Media Western Regional Conference, Denver, CO—Nov. 14, 2003, www.newtek.com/news/releases/11-14-03a.html.

NewTek Releases Free Update to VT[3]™, San Antonio, TX—Sep. 30, 2003, www.newtek.com/news/releases/09-30-03a.html.

NewTek Introduces VT[3]™, Integrated Production Suite, San Antonio, TX—Jul. 22, 2003, www.newtek.com/news/releases/07-22-03a.html.

NewTek Announces Genesis™: New Video Production System for Worship, San Antonio, TX—May 21, 2003, www.newtek.com/news/releases/05-21-03a.html.

NewTek Announces Early VT[3]™ Shipments to include Free LightWave 3D®, Las Vegas, NV—Apr. 7, 2003, www.newtek.com/news/releases/04-07-03a.html.

NewTek to Premiere VT[3] at NAB, San Antonio, Texas—Mar. 17, 2003, www.newtek.com/news/releases/03-17-03a.html.

BOXX Technologies Extends Relationship with NewTek, Inc. to Offer VT[2] on 3DBOXX, Austin, TX—Jan. 31, 2003, www.newtek.com/news/releases/02-07-03a.html.

NewTek Releases XP-Compatible VT[2]® Update, San Antonio, TX—Jan. 28, 2003, www.newtek.com/news/releases/01-28-03a.html.

NewTek Releases RS-8™ Hardware Switcher Control Module, San Antonio, TX—Jan. 16, 2003, www.newtek.com/news/releases/01-16-03a.html.

* cited by examiner

120

356

INTEGRATED LIVE VIDEO PRODUCTION SYSTEM

BACKGROUND

1. Technical Field

This application generally relates to television production, and more particularly to an integrated television production system.

2. Description of Related Art

Existing control rooms and television production systems as may be used in connection with a live television broadcast, for example, from a television studio, of a sporting event, from a church, or from a corporate studio, typically include a collection of components, such as a tape deck, a switcher, one or more cameras, various data stores for graphics, clips, logos and the like. Each component may have its own control surface. To operate such traditional configurations may require a team of operators, such as a switcher operator, a tape deck operator, a graphics operator, and a director to direct all other operators to perform the needed operations at the correct times.

Existing systems may have a variety of drawbacks. For example, existing systems may be characterized as cumbersome since they are generally designed for use by a team of operators. Additionally, there may be instances where only a single operator is available thereby forcing the single operator may attempt to use the multiple controls for the collection of devices. Existing systems can be costly in terms of equipment, staffing, and space required for use during operation.

Thus, it may be desirable to provide an efficient and integrated television production control system which is generally less costly than the foregoing traditional system. It may also be desirable to have such a system be scalable for ease of use and control in accordance with a varying numbers of operators. It may also be desirable that such a system be easily configurable for use in different environments and applications.

SUMMARY OF THE INVENTION

In accordance with one aspect of the invention is a control panel comprising: one or more device selection buttons; and one or more controls that are programmable in accordance with selection of a first of said one or more device selection buttons. The one or more controls may be content selection buttons having a display that varies in accordance with selection of said first device selection button. The first device selection button may be programmable in accordance with a first show definition, said first device selection button having a first device association and first display format with said first show definition and a second device association and second display format with a second show definition. The device may be associated with one of: stored video data, stored audio data, stored audio-video data, stored camera position presets, and stored image data. The display of the one or more content selection buttons may include a filename. The one or more controls may include at least one of: a joystick, a knob, a forward button control, and a reverse button control. The control panel may include a display panel that displays a current state of controls in accordance with selection of a first of said one or more device selection buttons. The control panel may also include one or more source selection buttons that are programmable in accordance with a first show definition, each of said one or more source selection buttons including a content identifier displayed describing content associated with said each source, said one or more source selection buttons having first source associations and first display formats in accordance with a first show definition and second source associations and second display formats in accordance with a second show definition. The control panel may include one or more video overlay buttons having a display that varies in accordance with a selected input source, each of said one or more video overlay buttons including a content identifier reflective of a content of said selected input source. The control panel may be implemented using at least one of hardware and software. All buttons of said control panel may be one of: displayed on a graphical user interface, and keys included on a hardware unit. The control panel may include: a first memory including instructions for processing received messages; a first component that executes instructions from said first memory; a second memory including instructions for periodically refreshing a display of at least one of said buttons and updating said at least one of said buttons in response to a received message; and a second component that executes instructions from said second memory. The said first and second memories may be the same memory and the first and second components may be a same processor.

In accordance with another aspect of the invention is a method of controlling a show comprising: sending messages between a control panel and a computer system over a primary communication connection to control one or more devices; monitoring said primary communication connection to determine if said computer system is unavailable for communicating with said control panel; and in response to determining that said computer system is unavailable, using a backup communication connection to control said one or more devices during said show. The monitoring may be performed by said control panel. The primary communication connection may be independent from said backup connection. The computer system may control at least one of said one or more devices by communicating with a router to which said computer system and said at least one device is connected. At least one of said one or more devices may be directly connected to said computer system. The control panel may be connected to said router using said backup communication connection. The method may also include sending a message from said control panel to said computer system in response to a selection on said control panel. The method may also include, in response to receiving said message: updating state information about said control panel; and updating system status of a show. The state information may include at least one of: information local to said control panel, and information affecting a state of multiple control panels. The multiple control panels may include at least one hard control panel and at least one soft control panel having identical functionality. The sending and the monitoring may be performed during a show, and, prior to said sending and said monitoring, a configuration of at least one programmable button on said control panel may be defined. The method may include updating a display associated with said at least one programmable button in response to selection of another button of said control panel. Updating the display may include displaying a filename of content associated with said at least one programmable button. A transition may be made of on-air content from a first source to a second source using an effect indicated on a transition effect button, said transition effect button including a display that varies in accordance with a current selection of one of a plurality a selected effect buttons.

In accordance with another aspect of the invention is a system used in broadcasting comprising: at least one input source; at least one output source; and a control panel that controls operation of said at least one input source and said at least one output source, wherein said control panel includes at least one programmable control having content that is dynamically updated in response to selection of another control. At least one programmable control may be a button having a display that is updated in response to selection of another control. The at least one input source may be a previously stored data file. The system may also include: a router connected to at least one of: an input source and an output source, said router having a backup connection to said control panel; and a computer system connected to said control panel and said router, wherein said control panel and said computer system have a primary connection used for controlling operation of said at least one input source and said at least one output source, and wherein said control panel uses said backup connection to control said input and said output sources upon determination by said control panel that said control panel is unable to communicate with said computer system to control said input and said output sources.

In accordance with another aspect of the invention is a computer program product for controlling a show comprising code that: sends messages between a control panel and a computer system over a primary communication connection to control one or more devices; monitors said primary communication connection to determine if said computer system is unavailable for communicating with said control panel; and in response to determining that said computer system is unavailable, uses a backup communication connection to control said one or more devices during said show. The code that monitors may be included in said control panel. The primary communication connection may be independent from said backup connection. The computer system may control at least one of said one or more devices by communicating with a router to which said computer system and said at least one device is connected. The at least one of said one or more devices may be directly connected to said computer system. The control panel may be connected to said router using said backup communication connection. The computer program product may also include code that sends a message from said control panel to said computer system in response to a selection on said control panel. The computer program product may also include code that, in response to receiving said message: updates state information about said control panel; and updates system status of a show. The state information may include at least one of: information local to said control panel, and information affecting a state of multiple control panels. The multiple control panels may include at least one hard control panel and at least one soft control panel having identical functionality. The computer program product may include code that defines a configuration of at least one programmable button on said control panel, and wherein said code that defines is executed prior to said code that sends and monitors, said code that sends and monitors being executed during a show. The computer program product may include code that updates a display associated with said at least one programmable button in response to selection of another button of said control panel. The computer program product may include code that updates said display by displaying a filename of content associated with said at least one programmable button. A transition may be made of on-air content from a first source to a second source using an effect indicated on a transition effect button, said transition effect button including a display that varies in accordance with a current selection of one of a plurality a selected effect buttons.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
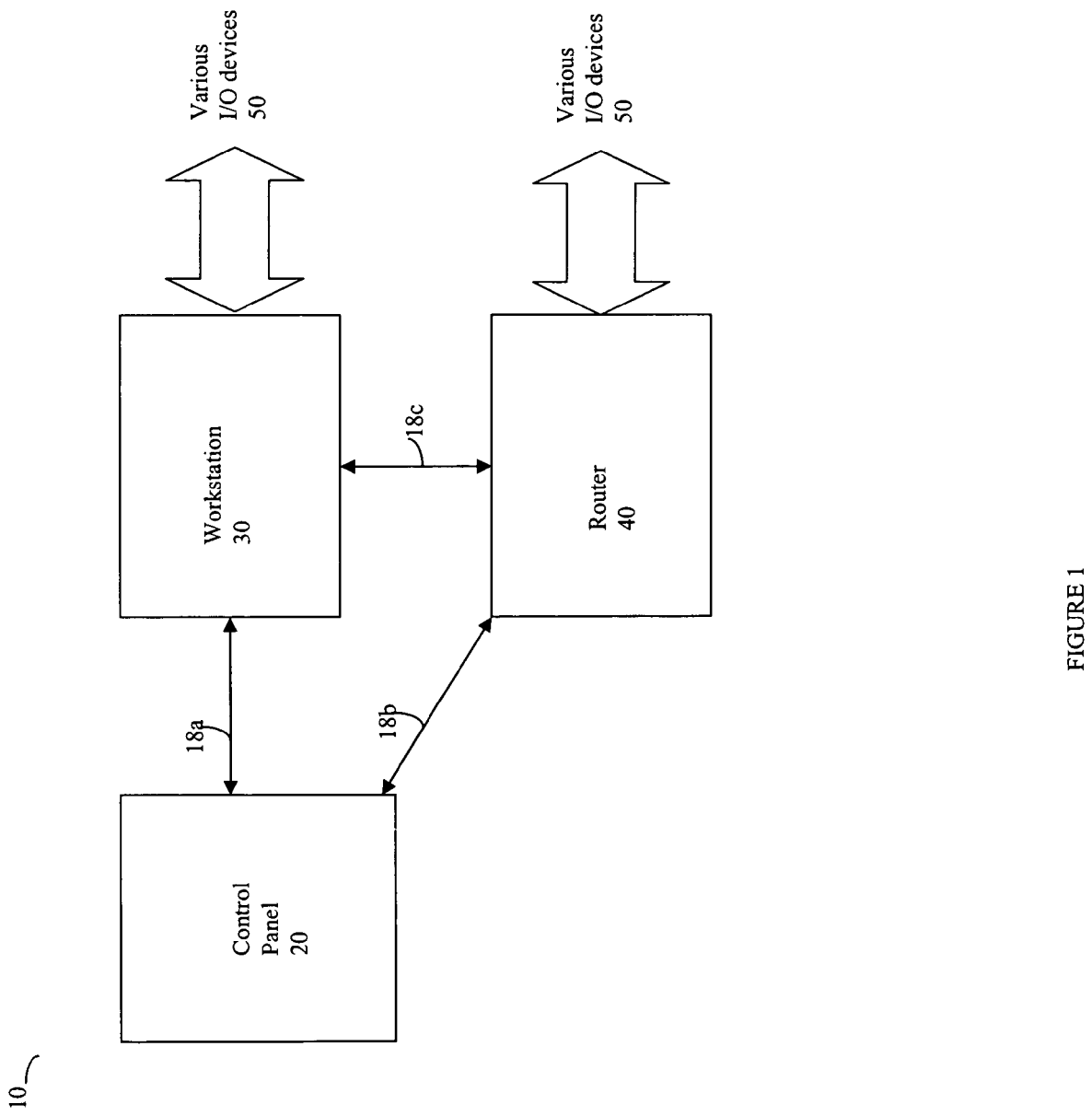
FIG. 1 is an example of an embodiment of a system according to the present invention.

Referring now to FIG. 1, shown is an example 10 of an embodiment of components that may be included in a system whose operation is described herein. The components of the system 10 may include a control panel 20, a workstation 30, a router 40, and one or more I/O devices 50. As will be described in following paragraphs, the components in the arrangement 10 may be included in an embodiment of a system used in connection with live television broadcasting as well as other applications. The components included in 10 may be characterized as an integrated system used, for example, in live video and/or audio production systems. Particular applications are described elsewhere herein in more detail. It should be noted that the components of 10 may be combined with other components not shown depending on the particulars of each embodiment and/or application.

The control panel 20 provides a switching capability for selecting between one or more of the various I/O devices 50. As shown in 10, the various I/O devices 50 may be connected to the control panel 20 through the router 40, and may also be connected, directly or indirectly, to the workstation 30. The control panel 20 is described in more detail elsewhere herein and may also provide, for example, for switching between other types of I/O sources that may be included in one or more data storage devices connected to the workstation 30, or on other data storage devices not shown in the system 10 on FIG. 1. Additionally, as will be described elsewhere herein, an embodiment of the control panel 20 may be implemented as a hard panel control device as well as via a soft panel control device. In connection with the soft panel control, the control panel may be displayed, for example, via a graphical user interface in a Windows-based environment on a computer display device.

During operation in a first mode in one embodiment, the control panel 20 may control operation of the I/O devices 50 and other I/O sources by issuing commands or requests using the workstation 30. The workstation 30 may channel the appropriate input source(s) to the appropriate output source(s), such as, for example, by interfacing with the router 40. In a second mode of operation, such as when the workstation 30 is offline with respect to the connection with the control panel 20, the control panel 20 may use a second mode of operation and directly interface with the router 40. The first mode may be characterized as a normal mode of operation. The second mode of operation may be characterized as a secondary or backup mode of operation. Both of these modes of operation are described elsewhere herein in more detail.

The workstation 30 may include hardware, such as a computer processor, and/or software, to perform processing associated with production as well as pre-production processing. For example, in connection with live production, a control selection message may be sent to the workstation 30 from the control panel 20. The workstation 30 may then control selection of the various I/O devices and associated streams in accordance with the message received from the control panel 20 and the current state of the control panel. The control panel 20 may send a message to the workstation 30 causing an input video stream to be displayed on a first output device, such as a monitor, connected to the router 40. The input video stream may come from, for example, a file stored on a data storage device of the workstation, a camera directly connected to the workstation 30, a camera also connected to the router 40, and the like. The foregoing are just some examples of how the components of the example 10 may be used in production. More details of the workstation 30 are described elsewhere herein.

The workstation 30 may be used in connection with pre-production processing. An embodiment of the workstation 30 may include, for example, pre-production software used to create and define shows, edit and store data, and the like. The results of pre-production processing may later be used in connection with live broadcasting or the production activities.

The one or more various I/O devices 50 may include, for example, tape recorders, microphones, video cameras, and the like. Additionally, as mentioned above, the control panel 20 may access, for example, still stores, logo stores, stored video and/or audio streams and animations, and the like, from data stores of the workstation 30. The foregoing I/O devices and data stores may be accessed during production, such as a live broadcast, as well as in connection with pre-production, such as in connection with editing.

An embodiment of the control panel 20 may include switcher functionality for switching between one or more I/O devices 50, and switching between other types of data stores or devices, such as may be included in, or connected to, the workstation 30. The control panel 20 may also provide for selection of special effects as well as program previewing, handling synchronous sources, such as video cameras and video tape recorders, as well as frame synchronizers for use in connection with untimed sources of input An embodiment may include a router 40 such as, for example, the Leitch Panecea Router. Particulars of the router used in an embodiment may be varied in accordance with the different types, number, and other characteristics of the I/O devices 50 included an embodiment of the system 10. In this embodiment, the router 40 may be characterized as a digital switcher interfacing with one or more digital type of devices. However, an embodiment of the system 10 may also include one or more I/O devices which are also analog devices. The analog devices may be connected to the router with or without an appropriate converter, such as an A/D or analog to digital or D/A converter placed therebetween, depending on the data stream direction. Similarly, other embodiments may include other system components such as video and/or audio embedders and/or de-embedders that may vary in accordance with the particular system and application. Some additional examples are described elsewhere herein. Such embedders and de-embedders are known to those of ordinary skill in the art such as those by, for example, AJA and Link.

It should be noted that an embodiment may include functionality of an embedder and/or demembedder with functionality of a router within a single component.

The workstation 30 may include any one of a variety of different computer processors in addition to the particular hardware and software described elsewhere herein in more detail. The workstation 30 in one embodiment may include, for example, a multi-stream Pinnacle TARGA 3000 board. The TARGA board, as will be described elsewhere herein in more detail, may be used in connection with the workstation 30 communicating with a router 40.

An embodiment of the workstation 30 may include pre-production software used offline, for example, in preparing elements to be included in a live broadcast. The pre-production software may be used, for example, to create graphics, assemble content, select devices for a show, and set up the switcher functionality of the control panel 20.

The components of the example 10 may communicate with each other and other components using one or more different communication mediums 18*a*, 18*b* and 18*c*. The communication mediums 18*a*-18*c* may be any one of a variety of network or other type of communication connections as known to those skilled in the art. The communication medium may be a network connection, bus, and/or other type of data link, such as a hardwire, wireless, or other connection known in the art. For example, the communication medium may be the Internet, an intranet, Ethernet, or other network or non-network connection(s) to facilitate communication as needed between the components of 10 and other components in accordance with the processing described herein.

It should be noted that the particulars of the hardware and software included in each of the components of 10, examples of which are described herein in more detail, may vary with each particular embodiment. Additionally, each of the components of 10 may all be located at the same physical site, or, alternatively, may also be located in different physical locations. The components of the example 10 and others included in a system may communicate with each other using any one or more different communication protocols that may vary in accordance with each embodiment. Some or all of the connections by which the components of 10 may communicate with each other and others may pass through other communication devices, such as switching equipment including, without limitation, a phone line, a repeater, a multiplexer or even a satellite.

Figure 2:
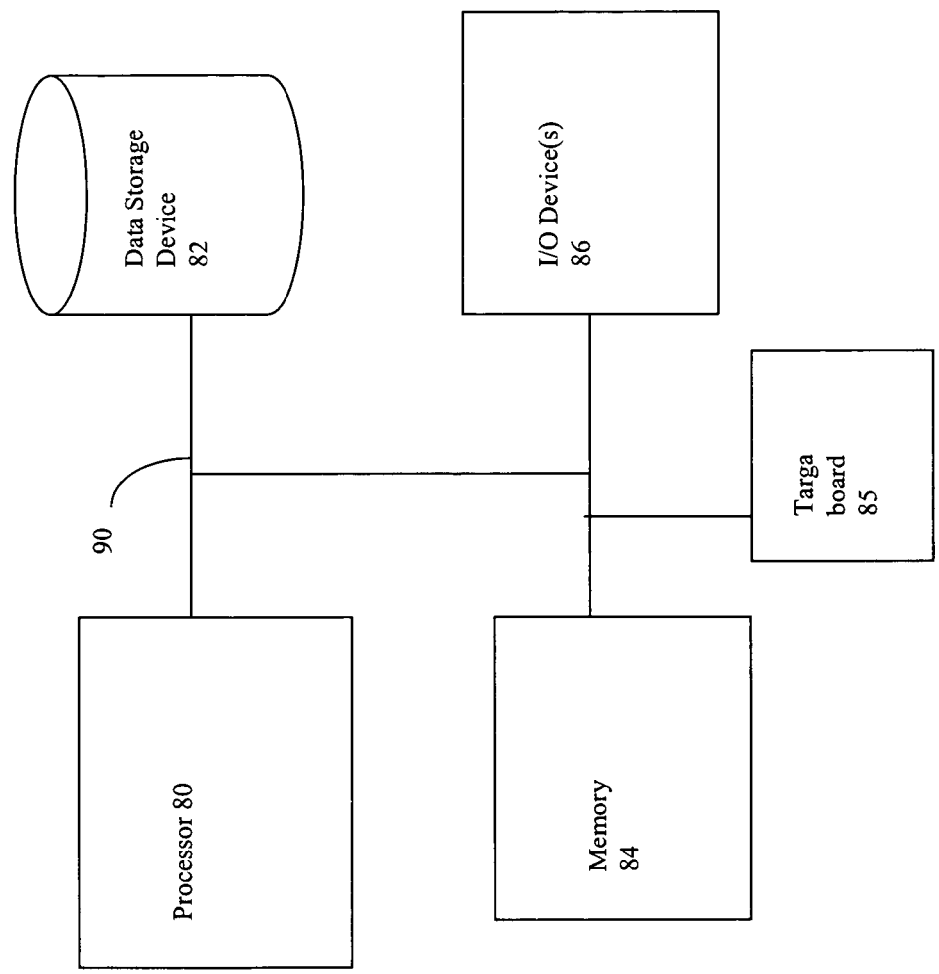
FIG. 2 is an example of hardware components that may be included in an embodiment of the workstation of the system of FIG. 1.

Referring now to FIG. 2, shown is an example of different hardware components that may be included in an embodiment of the workstation 30 previously described in connection with the system 10 of FIG. 1. It should be noted that components other than those depicted in FIG. 2 may be included within an embodiment of the workstation. The example 30 includes a processor 80, a TARGA board 85, a data storage device 82, memory 84, and one or more I/O devices 86.

The processor 80 of the workstation 30, and other processors that may be included in other components described elsewhere herein, may be any one or more of a variety of different commercially available, as well as proprietary, computer processors that are able to execute code to perform the functionality described herein. The processor 80 may be single or multi-processor system. The particular code may include, for example, code that performs pre-production processing or other processing described herein, interfaces with different components, and the like. The pre-production processing code may be stored, for example, on one or more data storage devices 82 such as a disk drive. Other code, such as lower-level code used to control devices, may also be stored in a read-only memory (ROM), a programmable ROM (PROM), and the like. As known to those of ordinary skill in the art, code may be loaded into memory 84, such as a random access memory (RAM) and executed by the processor 80. Data, such as a still store, video images, clips, and the like may be stored, for example, on the hard drive or other data storage device 82 of the workstation 30.

The data storage device 82 may include any number and type of data storage devices. For example, the data storage device 82 may include a single device, such as a disk drive, as well as a plurality of devices in a more complex configuration, such as with a storage area network and the like. Data may be stored, for example, on magnetic, optical, or silicon-based media. The particular arrangement and configuration may vary in accordance with the parameters and requirements associated with each embodiment. In one embodiment, data on the data storage device 82 may be accessed using logical device names or logical volumes. The logical volumes may or may not correspond to the actual data storage devices. For example, one or more logical volumes may reside on a single physical data storage device.

The embodiment 30 may also include one or more I/O devices 86 such as, for example, a keyboard, a mouse, a display device such as a monitor, and the like. Each of the components within the workstation 30 may communicate via any one or more of a variety of different communication connections 90 in accordance with the particular components included therein. For example, different components within the workstation 30 may communicate via a 64 bit, or other size, bus. It should be noted that the memory 84 may include, for example, read only memory (ROM), random access memory (RAM), or RAM and other types of memory that may be included in an embodiment of the system 30.

Figure 3:
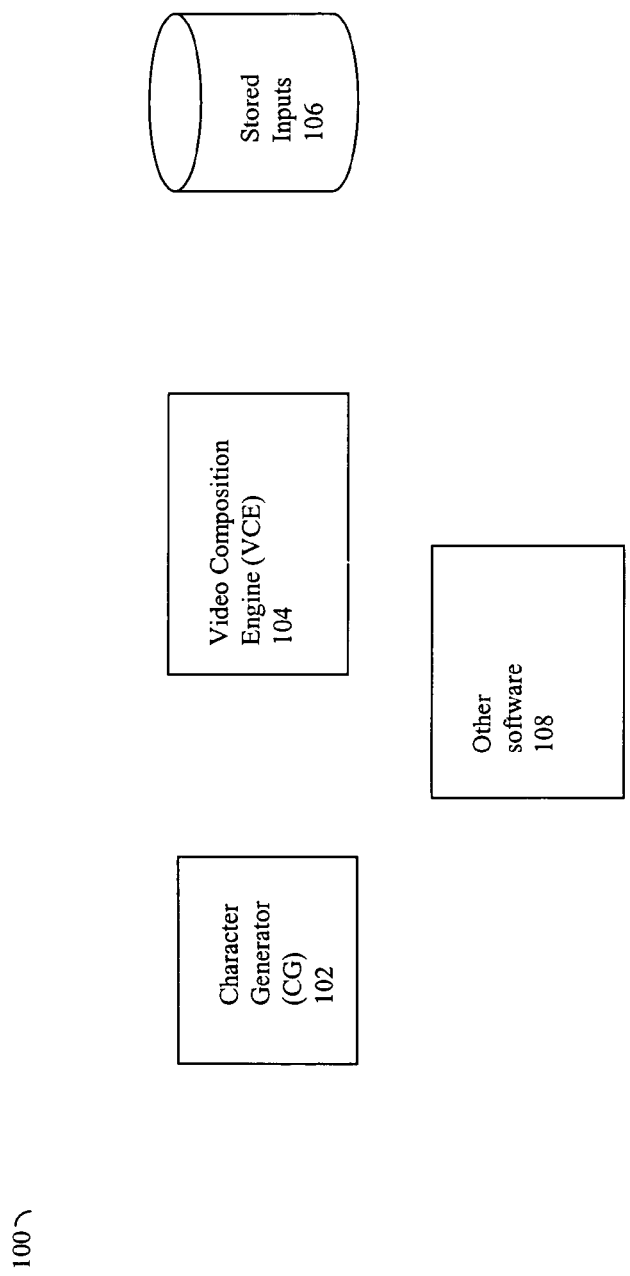
FIG. 3 is an example of software components that may be included an embodiment of the workstation of the system of FIG. 1.

Referring now to FIG. 3, shown is an example 100 of some of the software components that may be included within an embodiment of the workstation. In this example 100, the software components may include character generator (CG) 102, a video composition engine (VCE) 104, stored inputs 106, and other software 108.

The VCE 104 may be characterized as software that takes one or more source inputs and may be used in connection with producing the final image output. For example, the VCE may take as input sources from one or more cameras, a pre-stored title, and the like, and may produce as an output an image which is a composition of the one or more inputs stored for later production use. The VCE may also include the pre-production software as described elsewhere herein. The CG 102 may be used in creating of graphics, animations, and other files, for example, that may be stored within the inputs 106.

The stored inputs 106 may include, for example, clips, graphics, titles, logos and the like, that may be on a hard drive or other data storage device included in a workstation. The other software 108 may include, for example, any one or more operating systems and associated application software, such as the Microsoft Windows XP operating system and the Microsoft .Net Software, Internet Explorer or other browser, Flashplayer, lower level software such as device drivers to interface to the hardware, such as the TARGA board, and the like.

Figure 4:
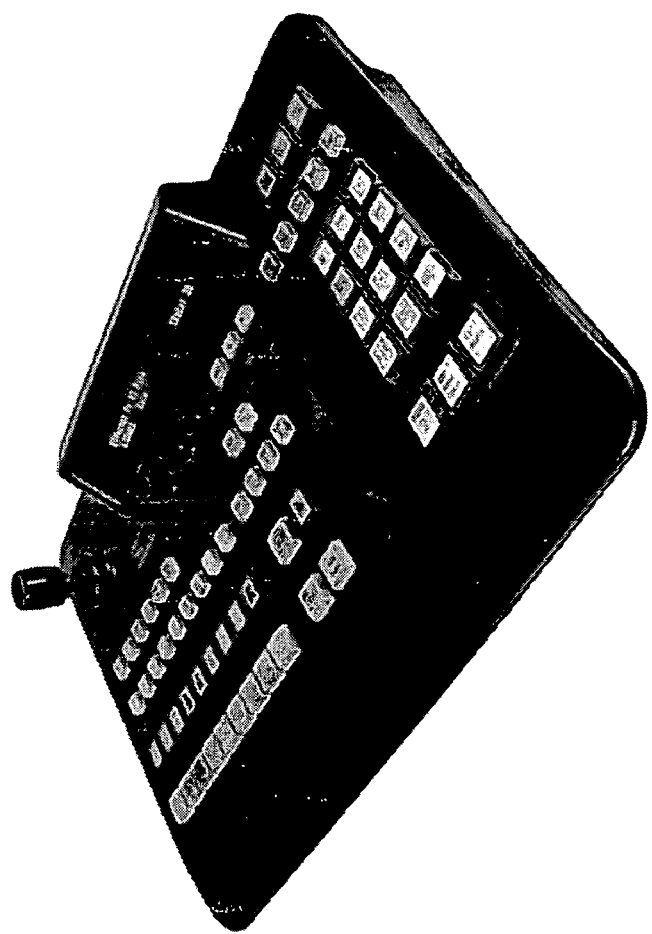
FIG. 4 is an example of an embodiment of a hard control panel.

Referring now to FIG. 4, shown is an example of an embodiment of the control panel previously described in connection with the components of FIG. 1. As also mentioned elsewhere herein, the control panel in an embodiment may be implemented as a hard control panel or a soft control panel. The control panel 120 of FIG. 4 is an example of an embodiment of a hard control panel. As will be illustrated in connection with subsequent figures, an embodiment of a hard control panel may include an interface design similar to that of a soft control panel that may be implemented, for example, as a graphical user interface using software.

It should be noted that although an embodiment may implement a hard control panel and a soft control panel with similar interfaces, an embodiment may also implement one or more of the foregoing using different interfaces. Additionally, although the embodiment shown in FIG. 1 includes a single control panel, as will be illustrated elsewhere herein, an embodiment may include one or more control panels each of which may be a hard control panel or a soft control panel.

Figure 5:
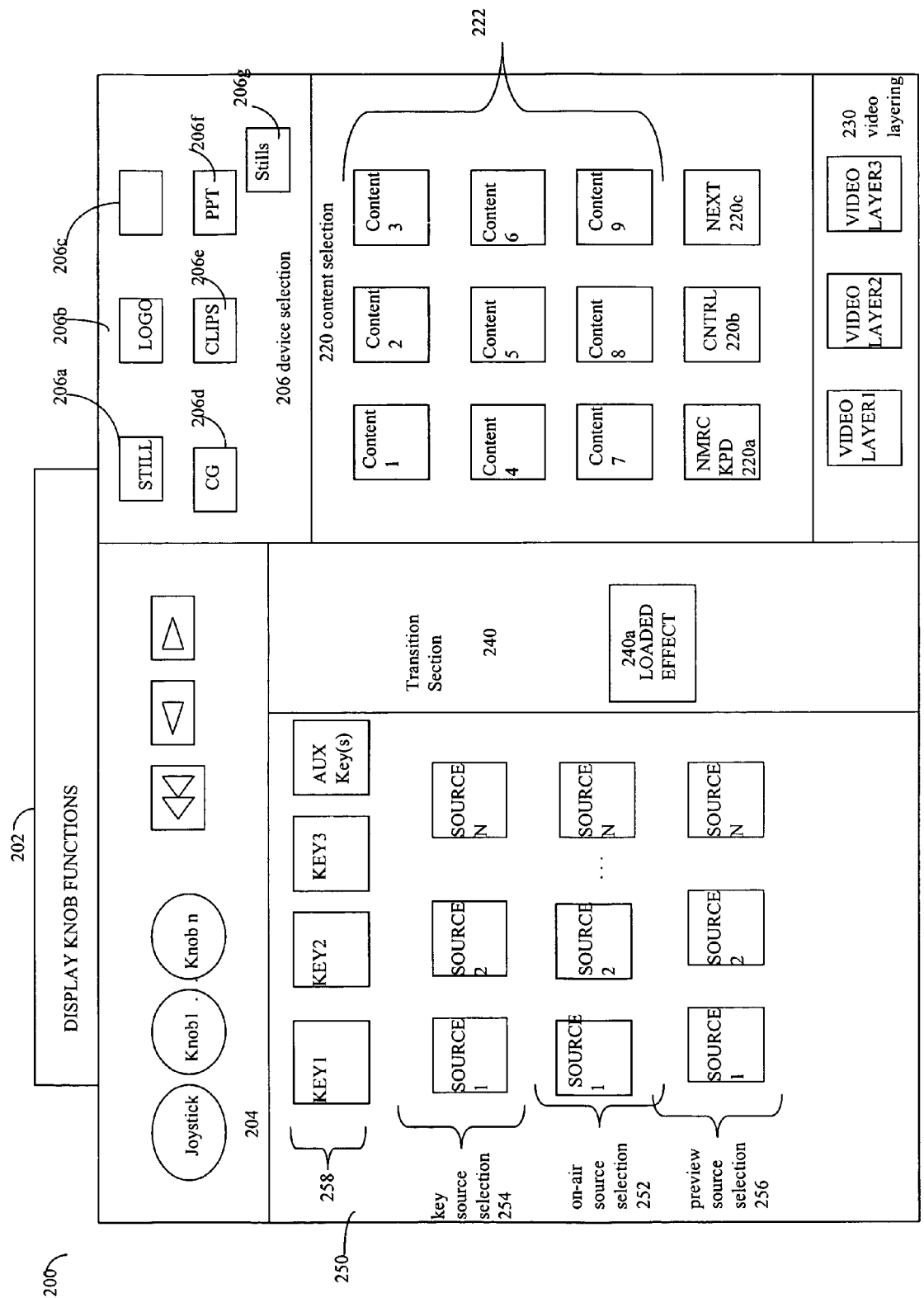
FIG. 5 is an example of an embodiment of a configuration of a control panel.

Referring now to FIG. 5, shown is an example of an embodiment of one configuration of a control panel that may be used in the components 10 of FIG. 1. The configuration 200 may be used in connection with a soft panel and/or a hard panel. The example configuration 200 of a control panel includes a display area 202, such as an LCD display for the different knob functions, a device adjustment area 204, a device selection area 206, a content selection area 220, a video layering area 230, a transition section 240, and a region 250. It should be noted that the particular buttons and controls shown in 200 are for purposes of illustration. Embodiments may include other or different elements than as shown in 200.

It should be noted that 220 may also be referred to as a second device adjustment area in addition to section 204. The function and/or display of elements in 220, 204, and 202 may vary in accordance with selection of another element from 206, 258 and 240a as described in more detail in following paragraphs. In other words, the function and/or display of the controls in 220 may be used in connection with content selection, for example, when a device from 206 is selected. When button 240a is selected, the function and display of the controls in 220 have different associated functionality and display contents that are described elsewhere herein in more detail.

The device adjustment area 204 may include, for example, different knobs, a joystick, and other controls that provide for adjusting a particular device that may be selected from region 206. The functionality of the particular adjustment component included in the region 204, such as a knob, may vary in accordance with a particular device that is active at a particular point in time. Thus, the display area 202 may be accordingly updated with the proper functionality associated with an element in the region 204. For example, if a particular device selected is an audio device, the knobs may provide for adjusting different audio features, such a volume. In the event that a video device is selected, for example, the knobs may be associated with different adjustment functionality. The device adjustment area 204 may also vary in accordance with other selections, such as a key or auxiliary output source from area 258.

Region 206 may include different devices that may be selected as an input or an output source. In this example of the control panel 200, the device selection region 206 may include the following buttons for selection: a first channel of stills 206a, logo 206b, CG (graphics) 206d, clips 206e, PPT or Power Point 206f, and a second channel of stills 206g. Additionally, in this example the control panel 200 includes a currently unassigned button 206c. As will be described in more detail elsewhere herein, the region 206 may include one or more programmable buttons, such as 206a-206c, each associated with a device. In this embodiment, a portion of the devices included in 206 may be varied in accordance with a show definition generated using pre-production software, as described elsewhere herein. The particular devices that may be varied have a display defined in accordance with information specified with a show definition. In other words, rather than have a fixed display, the button labeling and device associated with one or more buttons in region 206 (such as 206a-206c) may be varied and reprogrammed within an embodiment of the control panel. The programming of the buttons may be performed in an embodiment in which the control panel is a hard panel as well as a soft panel.

It should be noted that an embodiment of the control panel may include additional programmable buttons in other regions of the control panel as will be described in more detail elsewhere herein.

The embodiment 200 of the control panel of FIG. 5 also includes a content selection area 220. As described elsewhere herein, the controls in 220 may have other functionality and/or display than for use in connection with content selection. When a particular device from region 206 is selected, the functionality of some or all of the 12 buttons included in the content selection region 200 may be reassigned in accordance with the particular device selection button in 206 that is currently active. In this example, the top 9 buttons of 220 (222) may be assigned in accordance with different content elements for a particular device selected in region 206. Below the 9 content selection buttons 222 in this example are 3 more programmable buttons: 220a, 220b and 220c. Button 220a may provide for selection of the numeric keypad. If button 220a is depressed, the functionality associated with the 9 buttons of 222 as well as the control button 220b may reflect digits 0-9 and operate like a numeric keypad. If the control button 220b is selected, control functionality that varies with the particular device selected may be associated with the content selection buttons 222. If button 220c is selected, the next block of content may be displayed causing content buttons 1-9 of 222 to be reprogrammed or redisplayed with the next 9 content elements associated with the selected device 206. In other words, use of the next button 220c provides a scrolling capability to the next 9 content elements associated with a particular device selected in 206. Additional detail that may be included in an embodiment for the button displays are described elsewhere herein. It should be noted that the numeric keypad selection button 220a provides for input via content element by numbers, such as 1, 2, 3, and the like, which may be useful in connection with large content libraries.

Region 230 of the control panel 200 includes 3 video layering buttons. The different video layering buttons may display information as to what is included in each layer as may be related to a particular content element selected from 222. For example, as known to one of ordinary skill in the art, a particular content button may be associated with a file which is a video file that includes data comprised of different video layers. The different video layers, in addition to a background, may include different elements, for example, an image, a logo, and a title. Each one of these different elements may correspond to a particular video layer. Each of the different buttons included in the region 230 display additional video layering information in accordance with the particular content button that is selected in region 220.

Region 240 may be characterized as a transition section which may include buttons and other controls used in connection with transitioning, for example, between different input sources, such as cameras. Shown in 240 is the loaded effect button 240a. Other buttons and controls may be included in an embodiment of the transition section 240 that may be associated with traditional control panels and functionality. The loaded effect button 240a may be characterized as a transition effect button showing the particular technique selected for use in transitioning between input sources, such as in connection with transitioning between input sources on the air.

An embodiment of the control panel 200 may include other buttons and selection elements in region 250. Included in region 250 in this embodiment may be on-air source selection buttons 252, key source selection buttons 254, preview source selection buttons 256 and key buttons 258. Area 254 specifies sources for different video overlays associated with each of the keys or auxiliary sources of region 258. Area 256 specifies preview sources such as those used in connection with a preview monitor or device. Area 252 specifies sources for on-air selection such as those used in connection with an on-air monitor or device. In this embodiment, the on-air source selection buttons in 252 may be additional programmable buttons whose values are defined for a particular show duration. In other words, the values of the buttons 252 may change in accordance with each show. The particular on-air source selection button from 252 that is selected may specify, for example, a particular directory, folder, or other source of input. In one embodiment, there may be 9 on-air source selection buttons included in row 252. Other embodiments may vary the number and type of controls included in an embodiment of the control panel than as described herein. The particulars described in connection with FIG. 5 and others are merely for the purposes of illustration and example and should not be construed as a limitation of the techniques described herein.

As described above in one embodiment of the control panel 200, a portion of the buttons may have modifiable or programmable displays. Some of the programmable buttons may have a definition that lasts for the duration of a show as may be defined, for example, using pre-production software described elsewhere herein. These buttons may include, for example, the buttons in 250 and all of the buttons in section 240 except the button 240a. Other controls and programmable buttons have display content and/or functionality that may vary in accordance with the selection of other options or controls. These may include, for example, the display screen 202, the controls of 204, the buttons in 220 and 230, button 240a, and device buttons in 206. Furthermore, the different devices may be associated with buttons 206a-206c in accordance with a selected on-air source selection 252. The particular association among the programmable buttons as well as other information may be defined using pre-production software included in an embodiment of the workstation 30 or other computer system for defining what may be characterized as a show. This is described elsewhere herein in more detail in an off-line preproduction process.

In one embodiment, the control panel 200 may include a total of 28 programmable buttons. For example, one embodiment may include the 12 programmable buttons in region 220, 9 source programmable buttons in the on-air source selection row 252, 3 programmable buttons in the video layering region 230, 3 programmable device selection buttons in region 206 (206a, 206b and 206c), and a button in the transition section 240 called the loaded effect button 240a. Additionally, the display of 202 and controls in 204 may vary in accordance with a particular device in 206 selected or the particular key selected in 258.

To illustrate the use of the programmable buttons in connection with the control panel 200 of FIG. 5 consider the following example. A particular directory on a device located in a workstation may contain a variety of different types of stored data files. This directory may include, for example, power point files, graphics, clips from previously stored videos, and the like. The directory may be associated with a particular source button from 252. Certain types of files within the directory may be used in connection with a live broadcast show defined previously using pre-production software. The particular types of devices, or file types in this example, for the directory or folder may be associated with different device selection buttons in area 206. When the source selection button is selected from area 252 for this directory, a corresponding device selection button may also be selected from region 206 such that, for example, some or all Power Point files in a particular directory are displayed on the content buttons in the content selection region 220. This is one example of how the buttons in regions 252, 206, and 220 may be related. Selection of a different device in region 206 causes a change in the content selection 220 for buttons 1 through 9. This redisplay of content buttons 1 through 9 in region 220 happens in response to a user, for example, depressing a button in the device selection region 206.

In one embodiment with reference to FIG. 5, selection of an element from 258, 240a or 206 effects the functionality and/or display of controls in 202, 204 and 220. Additionally, selection of a content from 220 causes an update of a button/control included in on-air source selection 252. During live production, associations are made between an element of 254 and an element of 258. This association may be modified also during runtime or live production. Buttons in 230 display information about the particular content of each of the corresponding keys of 258. Each of the elements in 230 at a particular point in time have a corresponding element in row 252. Each of source1, source2, etc. buttons included in each of 252, 254 and 256 have a same source (such as a camera, clip store, and the like) as may be defined using pre-production software or other techniques off-line prior to the live production.

Figure 6:
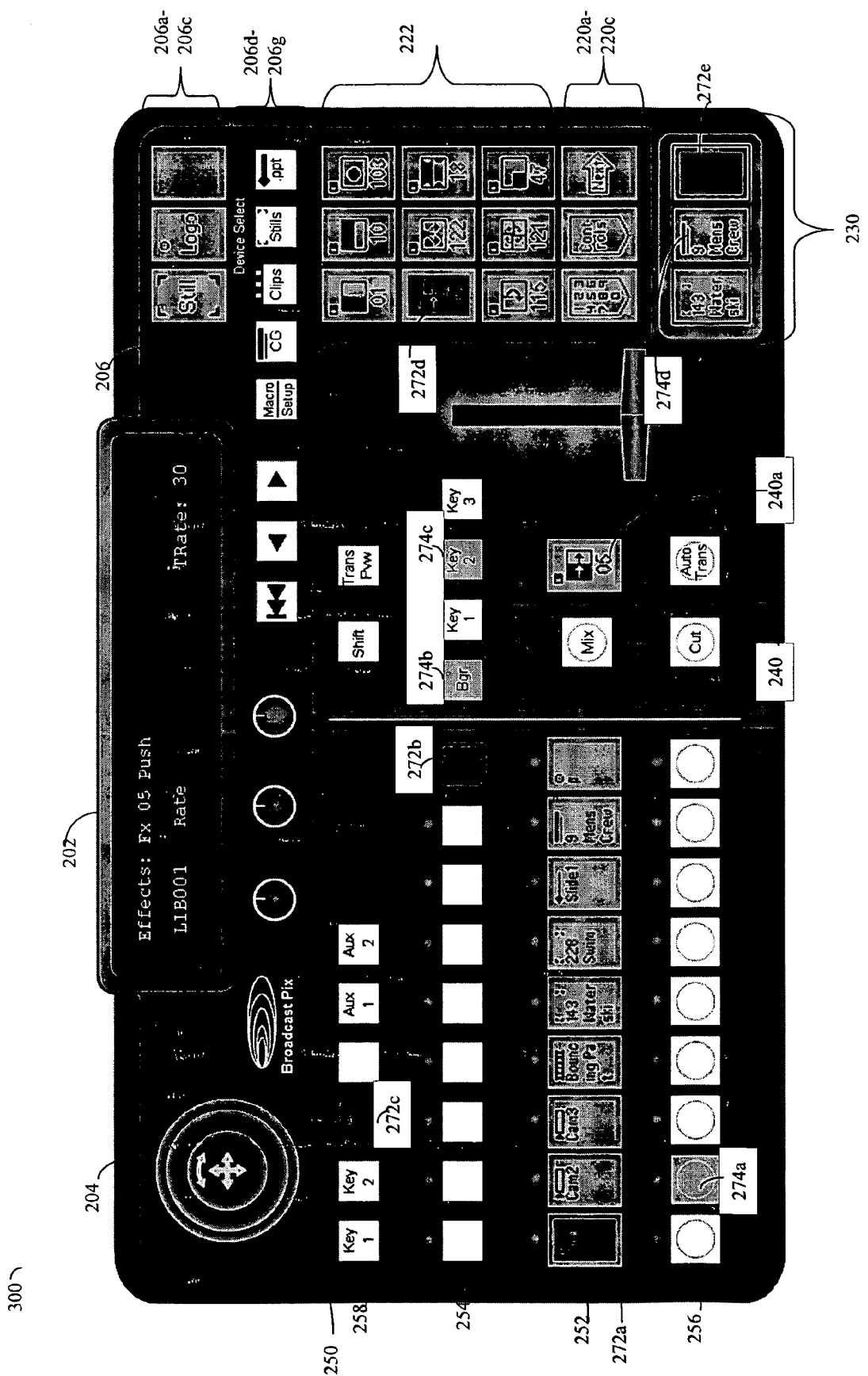
FIG. 6 is a more detailed representation of one embodiment of a control panel configuration.

Referring now to FIG. 6, shown is a more detailed example of an embodiment of a control panel. The example 300 shows additional detail in accordance with the description 200 previously shown in FIG. 5. It should also be noted that the particular details of the control panel 300 of the FIG. 6 may also be implemented in a hard control panel as well as a soft control panel.

In this particular example 300, the control panel includes 28 programmable buttons as described previously in connection with 200 of FIG. 5.

In one embodiment, each of the nine content selection buttons included in region 220 includes three particular portions. At the top portion of each of the nine content selection buttons may be an icon corresponding to the particular device selected, such as the device selected in area 206 which is currently active. It should be noted that this top portion may also include a device channel in the event that there are multiple channels, such as multiple clip stores. In the middle portion below the icon may be an image or other display corresponding to the content associated with each button. The middle portion of the button may include, for example, the actual name of the file that may be obtained in accordance with a previously defined show, or an image associated with the content. The name of the file may be obtained, for example, using the directory command in the event that the source selection button that is currently active corresponds to a directory within the workstation. In addition to the content name, there may also be a content number which may also be used when referring to a particular content element. An embodiment may provide for customization of the button displays to include different information or a different arrangement on a programmable key display than as described herein.

In connection with the foregoing, the display of the programmable buttons may be varied in accordance with the selection of a particular device. In particular, the content of the programmable display buttons 1 through 9 in the top portion of the content selection area 220 may be determined automatically when a particular device in area 206 is selected. As another example, if the clip device is selected in area 206 by depressing the clips button 206e referring back to FIG. 5, a clip icon may appear on the top of the button. Below the clip icon may be the content number and name for each particular clip. Similar behavior may occur when stills, CG, or any content is imported into a show in that the content number and name as well as device selected may automatically be displayed on a particular content button in 220. It should also be noted that in connection with displaying information on each of the programmable buttons regarding the content, the content may also be graphically represented such as with an image. An embodiment may also include the file name. The particular display of a programmable button may be defined in connection with a show definition using pre-production software.

In a similar manner, the display associated with other programmable buttons included in the embodiment 300 may be varied in accordance with currently active devices and selections. For example, the video layering buttons included in area 230 in the lower right corner include an icon at the top corresponding to the particular source from 254. At the bottom of each button in 230 is content identifier, such as a title corresponding to each of the particular file names. Included also may be a numeric identifier corresponding, for example, to a particular channel of the device, such as, for example, a still or clip store.

It should be noted that in connection with all of the buttons including the programmable buttons, a variation in color, shading, and the like may be used to indicate those particular buttons which are associated with an "on-air" status, or with a "preview" status. As known to those of ordinary skill in the art, the on-air status may be associated with those elements currently being broadcast to the particular on-air device or channel. The preview status may be used, for example, to preview elements that are going to be on-air next. The transition section 240 of the control panel may be used in transitioning from a current on-air element to a next element currently in the preview state. In one embodiment, the on-air state may be indicated by a red button display. Those elements of the control panel associated with the preview state may be indicated by an orange display. Buttons which are not selected in either preview or on air states may be of another color. Button colors may progress through a series of the three states. For example, selecting a white button causes the associated content to move to the preview monitor and the button display to be updated to orange. Through use of the transition section, an orange button may have its corresponding button display updated to red as it moves to on-air.

Consider the following example with reference to FIG. 6. Camera 1 272a may be selected as the current on-air background source. 274b is selecting that the next transition will involve a background transition from preview, which 274a is selecting as camera 2. 272e indicates that key 3 is currently on air and shows that its content is the logo generator (source9). 274b and 274c indicate that the background and key2, respectively, will be involved in the next transition from preview to on-air. 274c (key2) is also selected for preview display having content as indicated by 274d. In this embodiment, each of the different video overlays in 230 correspond to a respective one of key1-key3 included in the transition section 240 and 258. The preview element transitions 274b and 274c using the selected effect of 240a when a transition is performed, for example, using the lever or AutoTrans button from 240. In this example, the selected effect is indicated by button 272d which indicates that a push-off transition effect will be used. The push-off effect provides for a transitioning of the new on-air content to be pushed from the left to the right as the current on-air content is pushed off to the right. This and other transitions effects are well-known to those of ordinary skill in the art. Each of the different transition effects as displayed in 300 may correspond to a different one of the transitions, as described elsewhere herein in more detail. By selecting the Controls key in 222 and by turning the leftmost knob, the possible effects may be displayed on the keys in 222. Currently, the selected effect is that as indicated by 272d and 240a.

Region 240, as described in connection with other figures, is the transition section. The region 240 of FIG. 6 includes additional detail in comparison to that of FIG. 5. The controls in the transition section 240 with the exception of 240a are as known to those of ordinary skill in the art. It should be noted that particular embodiment described herein includes the additional control 240a in this section and the additional functionality of having the content of each of the key1-key3 in 240 have a corresponding content display button in 230.

It should be noted that the use of on-air source selection buttons 252 may not be typically used in connection with certain application such as, for example, live broadcasting. Content may progress from the preview status as may be displayed, for example, on a preview monitor, prior to going on the air.

What will now be described are particular examples of the different programmable buttons and how they may be used in an embodiment of the control panel.

Figure 7A:
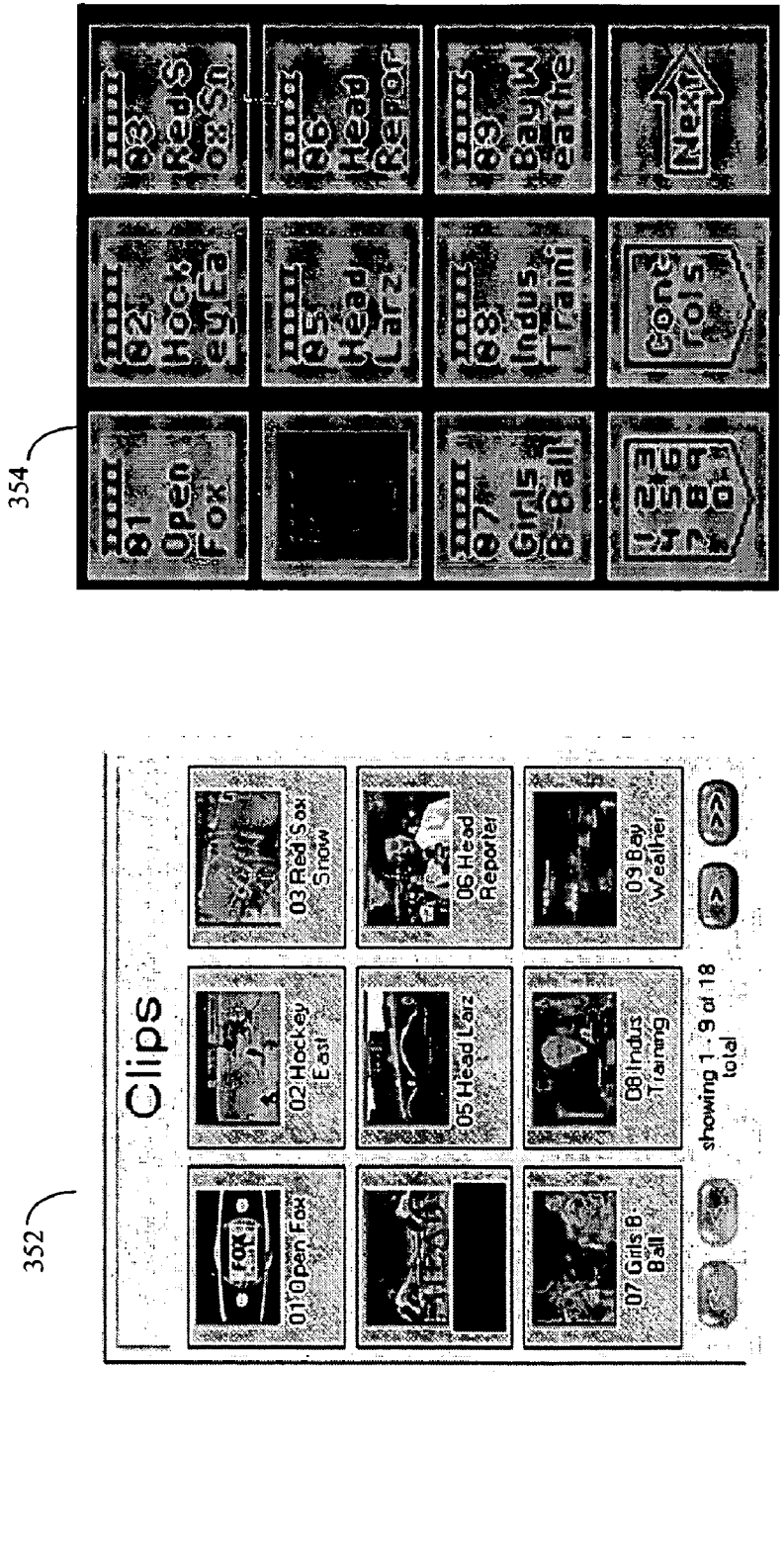
FIG. 7A is an example of a set of clips and corresponding content selection buttons that may be included in an embodiment of a control panel.
Figure 7B:
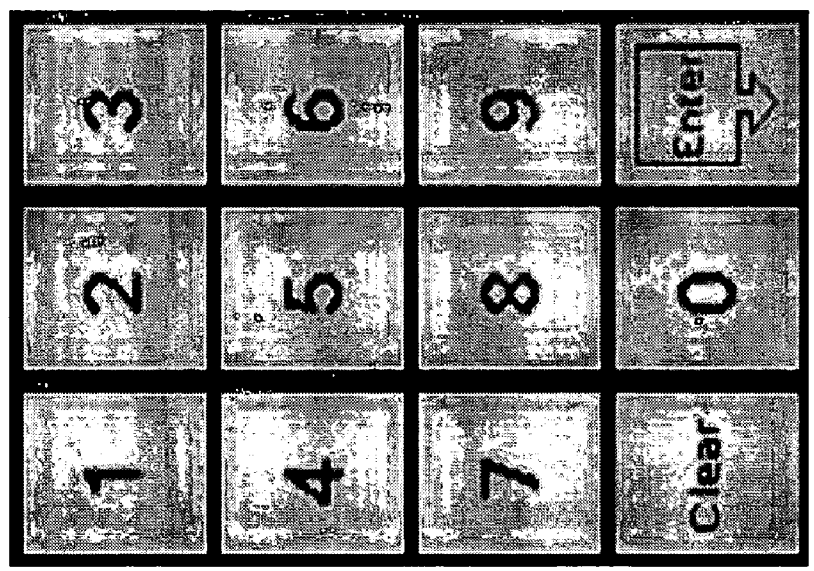
FIG. 7B is an example of a numeric keypad display that may be included in an embodiment of a control panel.

Referring now to FIG. 7A, shown is an example of a set of clips and corresponding content selection buttons that may be included in a portion of a control panel when the clips device in region 206 is selected. The clips 352 may correspond to particular video clips stored, for example, on a data storage device at the workstation 30. In the illustration 350, each of the clips included in 352 has a corresponding programmable button display in region 354. Each of the buttons included in 354 may correspond to the twelve buttons included in the contents selection area 220 previously described in the control panel 200 of FIG. 5. If the clips device is selected from region 206 of a control panel, the programmable buttons in the contents selection area 220 may be displayed as indicated by 354. The top portion of each of the content buttons 1-9 includes an icon corresponding to a device that is a clip. Unique to each of the buttons below the icon is information related to the content of the clip itself. In this example, a number corresponds to a particular number associated with a clip that may be included in a library. Beneath the number is a title that may be associated with the title of a clip file as stored, for example, on a data storage device. In the bottom of the clip display 352, it is shown that there are 18 clips of which 9 are currently displayed in 352. Subsequently, assuming all 18 clips have been associated with this particular show and are located in the input source area, selection of the NEXT button from the display 354 results in an update of content buttons 1 through 9 with the corresponding clip information for clips 10 through 18. It should be noted that an embodiment may include other button displays. Additionally, an embodiment may provide for other ways of advancing through a particular content library. For example, referring back to the control panels 200 and 300, a knob may be associated with particular device. Twisting of the knob, for example, in a forward direction may cause the content of the library to advance forward and accordingly cause an update of the keypad programmable display buttons within the region 220 for the particular content. Selection of the lower left button from the display 354 causes the numeric keypad to be displayed as illustrated for example in 356 of FIG. 7B.

Figure 7C:
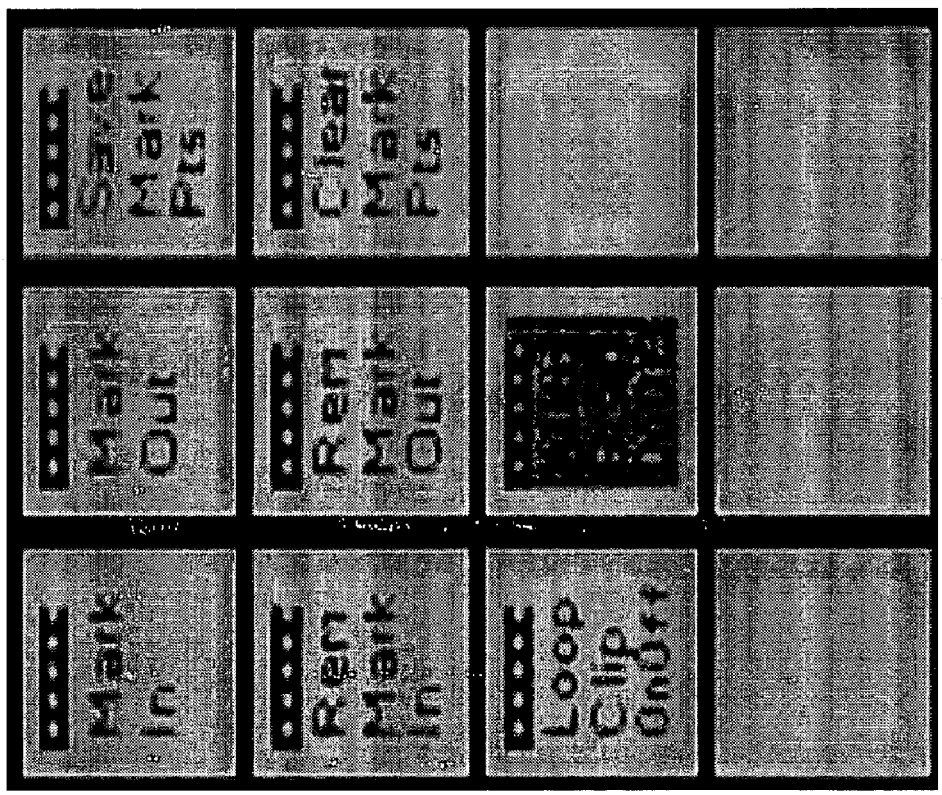
FIG. 7C is an example of buttons that may be displayed in a region of a control panel configuration for clip control modifiers.

Referring now to FIG. 7C, shown is an example 360 in which the buttons in region 220 in an embodiment of a control panel may be used in connection with clip control modifiers. The button display 360 may be performed in response to selecting the middle control button (CONTROLS) in the bottom row of the display 354 of FIG. 7A. Generally, selection of the CONTROLS button in the bottom row of the display 354 causes the controls for the particular device selected to be displayed on each of the buttons in 220. The various buttons in 360 may be used in connection with clip modifiers. For example, as known to those of ordinary skill in the art, the buttons may be used to set mark in and mark out points, or set a clip to loop, or to auto start when taken from preview to program or on-air. Each of these different clip controls and others are known to those of ordinary skill in the art. Other types of tools or devices that may be included in an embodiment of 206 may have their own particular modifiers.

Figure 7D:
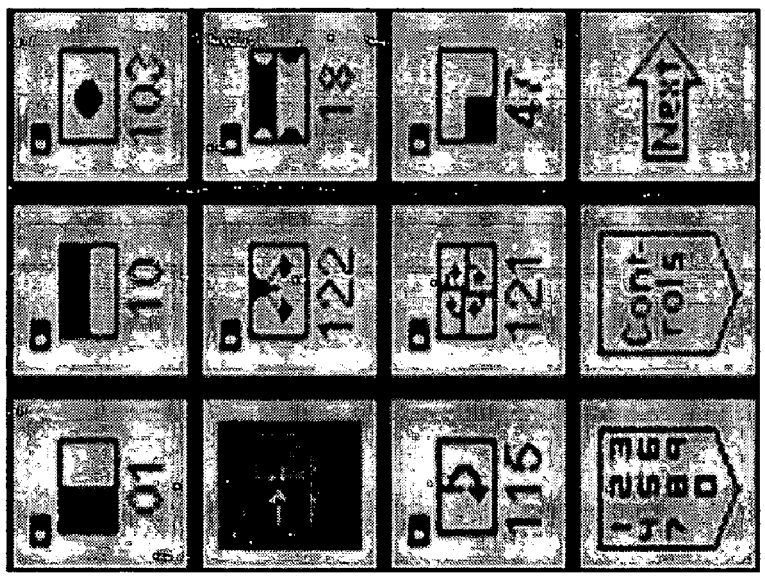
FIG. 7D is an example of buttons that may be displayed in a region of a control panel configuration for different effects.

Referring now to FIG. 7D, shown is an example 370 of the buttons in region 220 associated with different effects. In one embodiment, the display 370 may be in response to selection of the effects button 240a displaying the various effects. It should be noted that the different transition effects are known to those of ordinary skill in the art. Each of the different effects that may be included in an embodiment may have a corresponding button and display.

Figure 8:
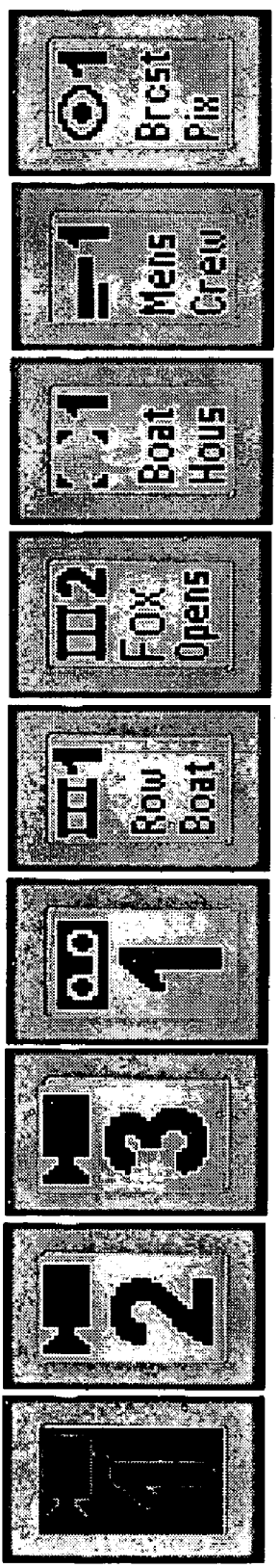
FIG. 8 is an example of programmable button displays that may be included in an on-air source row selection of an embodiment of a control panel.

Referring now to FIG. 8, shown is an example of the programmable button displays that may be included in an on-air background source selection row 252 of a control panel. In this example, the first button on the left corresponds to a camera that is selected and is on the air. The other sources as indicated by the remaining buttons are two additional cameras, a digital recording device, two channels of still store (as indicated by the rowboat and FOX Opens), a Power Point store (as indicated by Boat House), a CG Store or graphic store (as indicated by Men's Crew), and a logo store (as indicated by Brcst Pix). The particular device as described elsewhere herein in connection with other display buttons may correspond to the icon at the top of each of the buttons included in 380. Additional information regarding the content and/or channel may be displayed in addition to the particular icon as also indicated by the display button 380.

In one embodiment described herein, there are 28 programmable buttons and other controls that may be partitioned into two general classes: those which may vary in accordance with a current selection of another control, and those which are assigned a value for the entire duration of a show although they may be change in accordance with each show With reference to FIG. 5, the controls included in regions 202, 204, 206, 220 and 230 as well as button 240a may vary in accordance with a current selection of another control. The controls in 250 and the remainder of 240 may be defined for the duration of a show.

Figure 9:
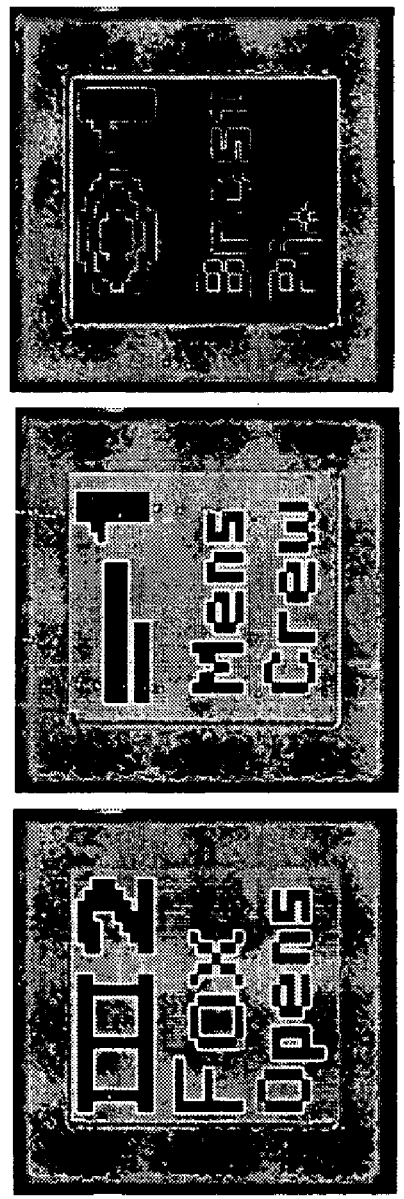
FIG. 9 is an example of video layering buttons that may be included in an embodiment of the control panel.

Referring now FIG. 9, shown is an example of particular buttons that may be included in the region 230 characterized elsewhere herein as the video layering buttons. The content of these buttons may be displayed, for example, in response to a particular content selection of a button in 220. The display buttons included in 400 include a first button corresponding to a clip as indicated by the device icon at the top. The top portion of these buttons may vary in accordance with the currently active device such as may be selected from region 206. The middle button indicates that "Men's Crew" corresponds to a title. The right most button which may be selected and have the on-air status indicates that a particular logo is used.

The foregoing are example arrangements and configurations of buttons that may be included on a control panel. As described herein, during production or real time, the devices and the show may be controlled from either a hard control panel or a soft control panel. It should be noted that an embodiment may use hard control panels and soft control panels interchangeably or together for a team operation, for example, when multiple operators might work together in a particular configuration. While an embodiment of the hard panel may provide better performance in terms of run time, the soft panel may be used in connection with providing a lower cost alternative.

Figure 10:
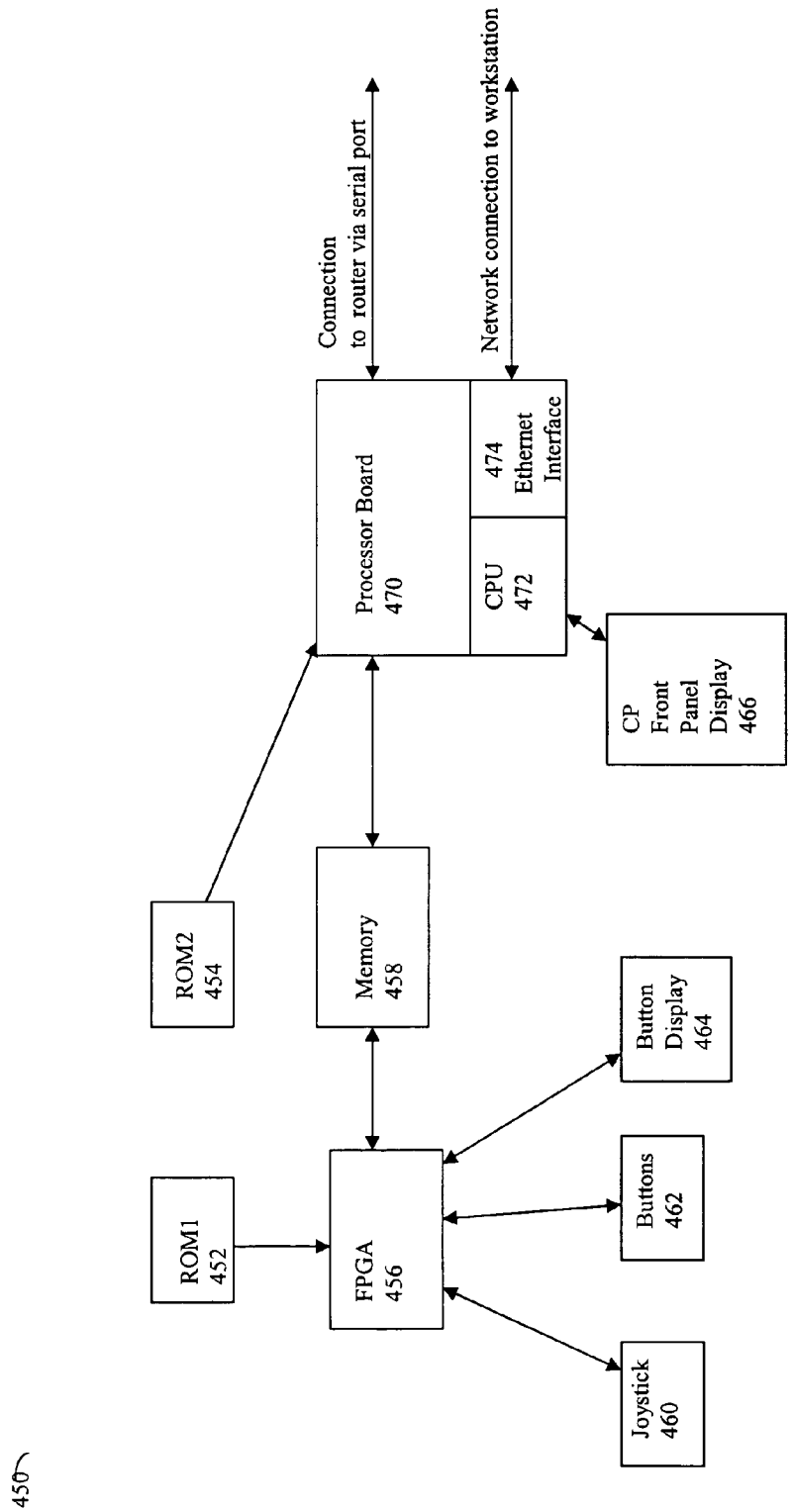
FIG. 10 is an example of components that may be included in an embodiment of a hard control panel.

Referring now to FIG. 10, shown is an example of hardware that may be included in an embodiment of the hard control panel. Included in this embodiment 450 are a first ROM (ROM1) 452 a second ROM (ROM2) 454, an FPGA 456, a memory 458, outputs to the various elements of the hardware (including, for example, the joy stick 460, the buttons 462 and the buttons display updates 464), a processor board 470 and a connection to the control panel display 466. Included on the processor board 470 may be a processor or CPU 472 and one or more communication interfaces, such as an Ethernet card or interface 474. In one embodiment, the CPU 472 included within a control panel hard panel implementation may be the eZ80 processor by Zilog. ROM2 454 may be used to store instructions that are executed by the CPU 472. ROM1 452 may include instructions used by the FPGA 456. Memory 458 may be, for example, a random access memory (RAM). In addition, the Ethernet interface card 474 may provide, for example, a connection to the workstation as described elsewhere herein. Similarly, the processor board 470 may include a connection to the router via the serial port as well. It should be noted in this particular embodiment that both ROM1 and ROM2 may come loaded with instructions with functionality that will be described elsewhere herein. It should also be noted that an embodiment may include a programmable ROM (PROM) in place of one or both of ROM1 and ROM2. An embodiment including a PROM, for example, may load other instructions from a network connection or other port.

In one embodiment, ROM2 454 may include instructions that simulate a Flash Player running within a browser to simulate the soft control panel. Additionally, ROM2 454 may include instructions providing for interpretation, sending, and receiving of XML commands as may be communicated between an embodiment of the control panel, which in this instance is a hard control panel, and the workstation as described elsewhere herein. In order to determine the instructions that need to be included in an embodiment of the ROM 2 454, the XML commands coming out of the workstation may be examined and then simulated using instructions stored in the ROM2 454. It should be noted that an embodiment may vary the instructions stored in the ROM 2 454 in connection with simulating other types of software, the particular hardware, and other particulars that may vary in accordance with an embodiment. In this particular embodiment, the hard control panel and the soft control panel behave in a similar fashion so that the workstation may communicate with either the hard control panel or the soft control panel in the same manner. By having the ROM2 454 include instructions that simulate the behavior of a soft panel by simulating Flash Player, and interpreting and sending XML commands from/to the workstation, the workstation may interact with a control panel that is implemented in hardware and/or software in an embodiment in which the soft control panel also runs the software which is simulated by executing the instructions included in ROM2.

It should be noted that an embodiment may include a different number of components in different configurations than as shown in FIG. 10. For example, an embodiment may include a different number of ROMs than as shown in FIG. 10. An embodiment may include, for example, a single ROM or more than 2 ROMs. Other variations of the configuration of FIG. 10 and others described herein are known to those of ordinary skill in the art.

In one embodiment, ROM 1 452 may include instructions which are loaded into the FPGA (field programmable gate array) 456 to control the buttons and associated displays, and other controls. As known in the art, the FPGA may be used in an embodiment as an alternative to a custom-designed integrated circuit and may be programmed to perform a variety of different operations. In one embodiment, the FPGA is responsible for the state of all controls except for the display 202. In this embodiment, the display area 202 is updated by instructions loaded from ROM2. The FPGA may poll the joystick, buttons, and other controls to detect any selection changes, such as when a user makes a selection via the control panel. Alternatively, an embodiment may have a signal generated to notify the FPGA when a selection or state change of a control occurs. The state change with respect to a control in the control panel is then communicated from the FPGA 456 through memory 458 to the processor board 470. Appropriate XML messages are formed and sent to the workstation over the network connection. The XML message sent to the workstation includes state information about the particular button or control and the selected configuration or state. This may include, for example, a particular button and a status, such as a change to "preview" or "on-air" status. The workstation stores the configuration and state of each control panel which may be updated in response to XML messages received from the control panel.

Initially, the workstation sends two sets of information to the control panel: 1) all controls that stay fixed for the duration of the show and 2) controls that may vary from control panel to control panel. The workstation may update those in 2) in accordance with a particular button selection and associated state during operation. For example, if the device selected changes, the new content information, as stored in the workstation configuration information for each control panel, is communicated from the workstation to the control panel. The workstation may also communicate to the control panel a color state change of a button, such as when a selected button has its associated state changed from preview to on-air.

The FPGA in this embodiment also includes instructions for updating the button displays at predetermined time intervals. For example, the programmable buttons may be updated 10 times every second. This update is necessary because in this embodiment the text and content as displayed on the different buttons and/or display may fade and need to be accordingly refreshed. This is the technique used in this embodiment to update the buttons and the corresponding displays. Other embodiments may use different techniques and/or different refreshing rates.

Figure 11:
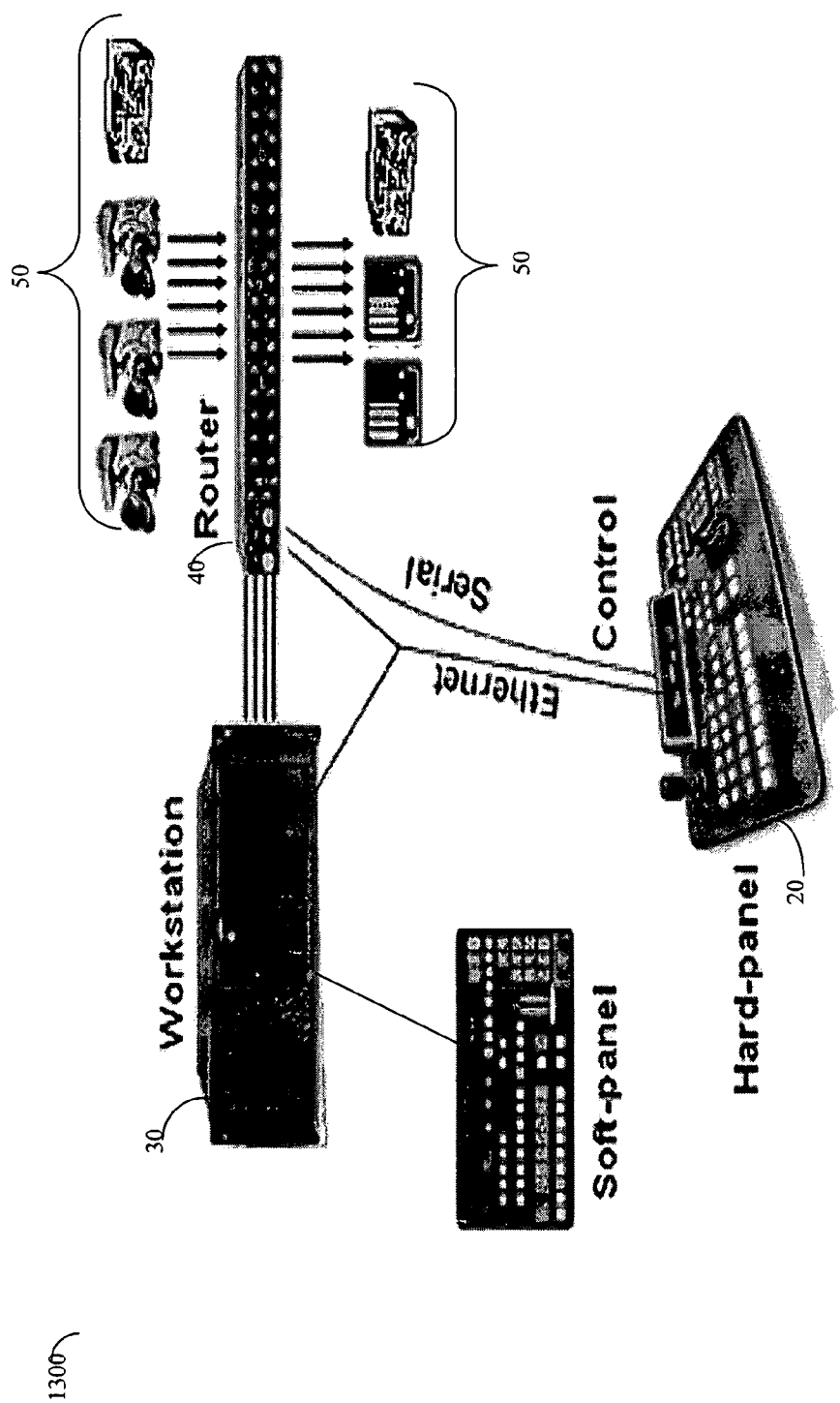
FIG. 11 is an example of components that may be included in an embodiment of a system of FIG. 1.

An embodiment of the hard control panel 20 may execute instructions, such as may be loaded from ROM2, to determine if a particular connection is on-line. Referring now to FIG. 11, shown is an example 1300 of components that may be included in an embodiment of a system. The example 1300 illustrates the components and connections therebetween to control the devices 50. An embodiment of the hard control panel 20 may include code that continually detects whether a particular primary connection, such as an Ethernet or other connection, to the workstation 30 is functioning. If the hard control panel 20 determines that the primary communication connection between the control panel 20 and the workstation 30 is not functioning, the hard control panel 20 may stop sending information to the workstation and use an alternate backup connection, such as a serial connection for controlling the various I/O devices 50. In this instance, for example, information from the workstation 30, such as a particular still store, logo, and the like may not be available while the workstation 30 is unavailable to the hard control panel 20. However, the hard control panel 20 may directly connect to the router 40 in connection with controlling and communicating with the one or more various I/O devices 50 previously described in connection with FIG. 1 in the event that the workstation becomes unavailable or is perceived as off-line by the control panel. Also included in 1300 is a soft control panel that may be displayed, for example, on a monitor of the workstation, or another computer system, such as a laptop computer with a processor different than that of the workstation.

It should be noted that the backup connection in this embodiment is a serial connection. However, an embodiment may use other types of communication connections as the backup connection. For example, the backup connection can be a parallel or other communication connection. The backup connection can be from a hard control panel or soft control panel that may be displayed, for example, on a laptop or other computer system in addition to the workstation. Additionally, an embodiment may include multiple backup connections.

An embodiment of the hard control panel may include a timer which sends a message to the workstation at predetermined time intervals. The workstation may respond to this message to indicate that it is on-line and available. This message may be characterized as a PING command used to test the presence of an active system at the other end of a connection. The workstation may send a PING message at regular intervals to the hard control panel. If the hard control panel does not receive successive PINGs within a predetermined amount of time, the hard control panel may consider the workstation to be offline.

The connection between the hard control panel and the workstation may be re-established when the workstation and its connection to the hard control panel come back on-line. This may be performed using any one or more different approaches. In one embodiment, there may be a reconnect button on the hard control panel. The reconnect button may be selected by an operator to reconnect the hard control panel and the workstation. When selected, the reconnect button may cause the hard control panel to send an XML message to the workstation to resume the connection and operations for controlling the devices, and the like. Until the workstation receives this reconnect XML message, the workstation does not resume the previous mode of operation and communication with the hard control panel. The determination of the workstation returning to an available or on-line state may be determined using manual and/or automated techniques. For example, an operator may reboot the workstation or fix a communication problem with the workstation. The operator may then select the reconnect button on the hard control panel to re-establish communications between hard control panel and the workstation using the network or communication connection. An embodiment may also provide an indicator on the hard control panel which indicates when the workstation is on-line. This indicator may be set as in response to the workstation sending a message to the control panel that it is back on-line. In response to viewing this indicator on the control panel indicating that the workstation is back on-line, an operator may select the reconnect button.

The messages exchanged between the control panel and the workstation may happen during broadcasting of a show. As described elsewhere herein, the show may be defined off-line prior to the real-time broadcasting using pre-production software that may be included in the workstation.

As described elsewhere herein, an embodiment may perform pre-production processing, such as using pre-preproduction software executing on the workstation or other computer system, to define a show. In one embodiment, the pre-preproduction software may include, for example, tools to create graphics, assemble content, select devices for a show and set up the control panel. The pre-production processing may be performed off-line without tying up the studio or its components. In connection with assembling content, the pre-production production processing may also include, for example, extracting frames from a video feed output from a device. The device can be, for example, a camera recording in real time in which the frames may be extracted in real time and then stored. The video feed may come from a video player playing back a previously stored video stream. The preproduction processing may also include audio editing and/or mixing with a video stream. Results from preproduction processing may be stored, for example, on a data storage device of the workstation or other device connected to the workstation.

What will now be described are examples of user interfaces and associated functionality that may be included in an embodiment in connection with defining a show. It should be noted that for the purposes of example, the show defined in following paragraphs may be used to produce the control panel display described elsewhere herein in connection with 300 of FIG. 6. Where appropriate, references may be made to elements in FIGS. 5 and 6 in following paragraphs.

Figure 12:
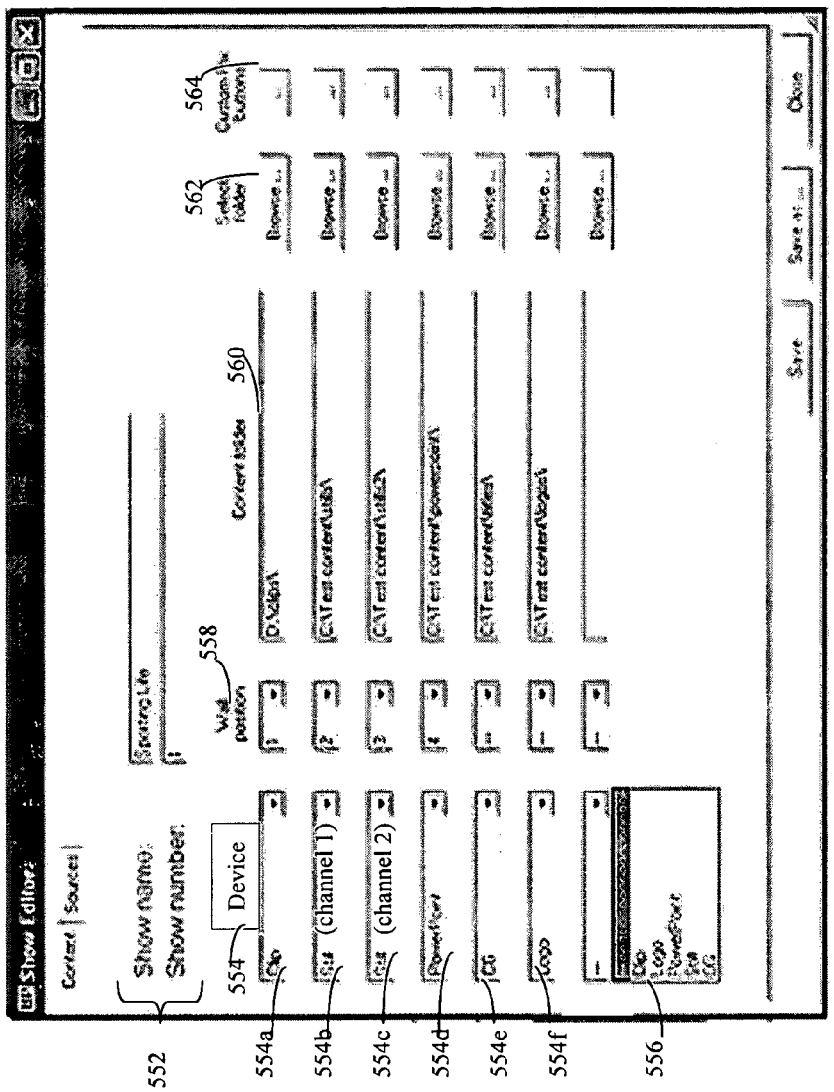
FIGS. 12 and 12A are examples of embodiments of a graphical user interface of a show editor.

Referring now to FIG. 12, shown is an example 550 of a graphical user interface of a show editor that may be produced using the pre-production software. The example 550 includes fields 552 for a show name and number used to identify this particular show being created. The example 550 also includes a device field 554, a wall position field 558, a content folder 560, a select folder field 562 and options to customize an associated button 564. The particular devices used for a show and content to be associated with each device are selected, respectively, using fields 554 and 560. Element 556 shows a drop down menu that may be used in connection with selection of particular devices. It should be noted that the devices specified in 554 and associated content in 556 may be used in defining the device buttons included in area 206 and the content buttons in area 220 of the control panel example of FIG. 5. In 550, the show being defined includes 6 stores in total: a clip store, 2 still stores, a Power Point store, a CG store and a logo store. The content associated with each of these stores, such as a particular directory or folder, may be specified in fields of 560. This content may then be displayed on buttons of area 220 in the control panel of FIG. 5 when the show is being broadcast. Using fields from 562, a file browser may be used in selecting the particular content for 560. The wall position 558 in this embodiment refers to a display position in an arrangement of images on a monitor of the workstation. During broadcasting of the show in this embodiment, the arrangement of images may be displayed on the workstation monitor in the designated display position. The programmable content buttons, with reference to FIG. 5 area 220, may be defined using the fields in 564. In one embodiment, the names displayed for each content button may be obtained from the filenames, or may be customized. Using this interface, an association is made between a specific button in 206 and a device of 554. It should be noted that an embodiment may include multiple channels of a particular device type, such as a still store as illustrated in 554b and 554c of FIG. 12.

Figure 12A:
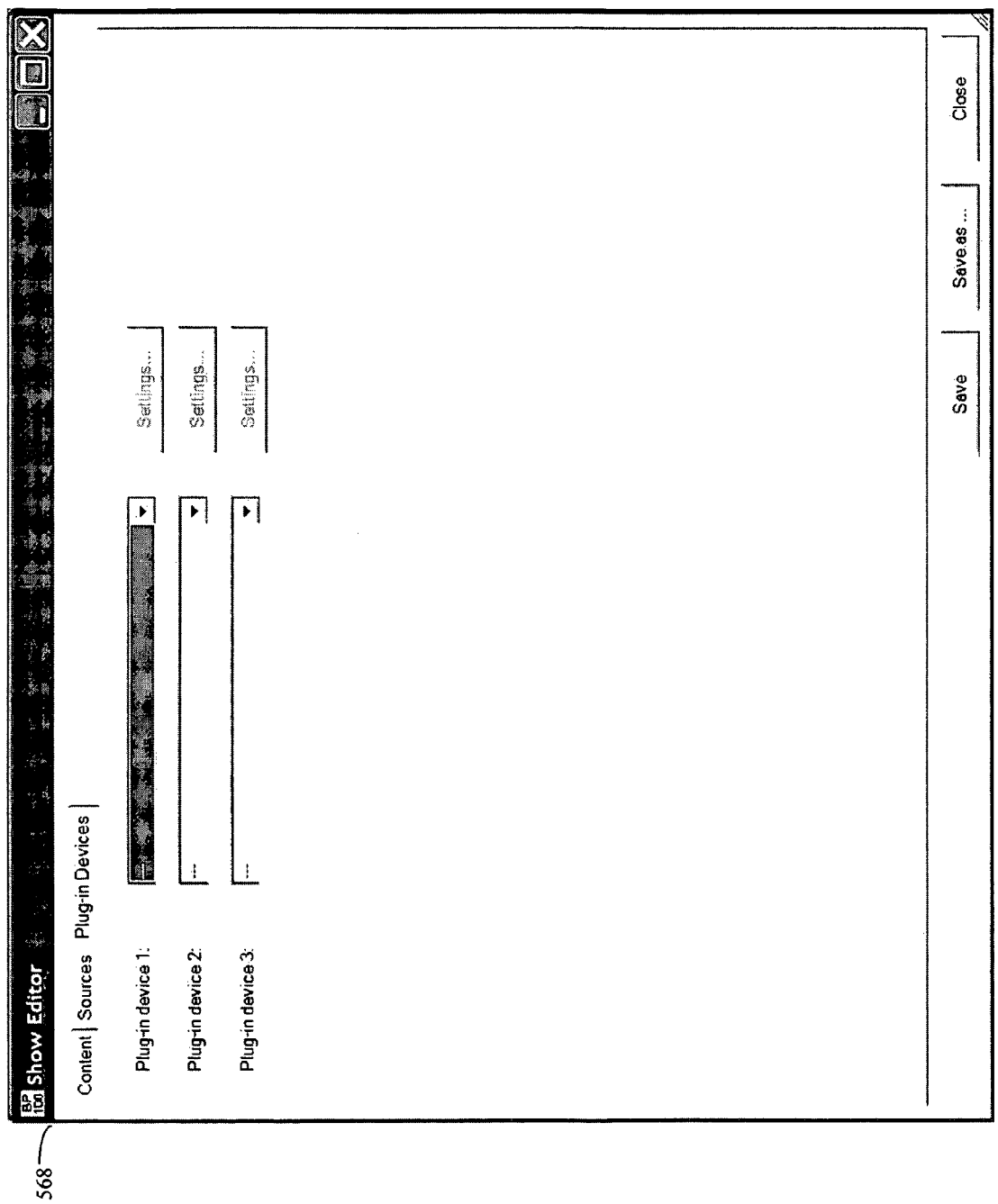

Referring now to FIG. 12A, shown is an example of a graphical user interface 568 that may be used in connection with performing device assignments to use other third-party devices. 568 may be used, for example, in connection with associating plug-in devices with the buttons in the device selection area 206. These plug-in devices may include, for example, third party devices connected to the workstation such as a pan and tilt device used to automatically control a camera, a lighting device, and the like. The foregoing provides for controlling the plug-in device using controls on the control panel, such as those from 204, 202, and 220. In one embodiment, the workstation may control the third party device using a communications port of the workstation. Controls from 220 may be used in defining preset camera positions, for example, when the plug-in device controls the angle of a camera. In one embodiment, the joystick may be used in position the pan and tilt camera control device in different positions. Each of the different positions may be defined and associated with a corresponding content selection button of 220. These are just some examples of how the different controls may be varied and associated in an embodiment.

Figure 13:
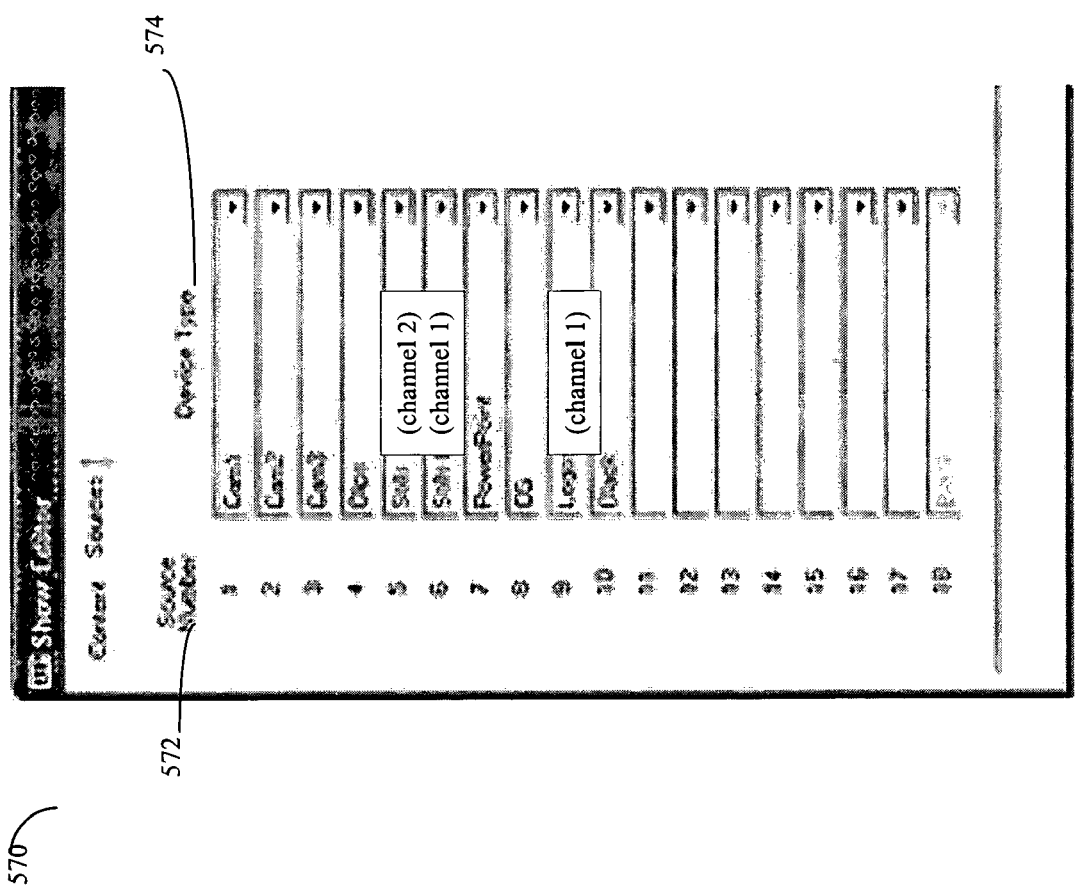
FIG. 13 is an example of a graphical user interface that may be used in defining the on-air source buttons of a control panel.

Sources may be assigned for each of the on-air source buttons, for example, with reference to the buttons 252 of FIG. 5. Referring now to FIG. 13, shown is an example 570 of a graphical user interface that may be produced using the pre-production software for defining the on-air source buttons. The particular source button of 252, 254 and 256 of FIG. 5 may be identified in 572 and associated with the device type in 574. Using 564 from FIG. 12, an embodiment may include functionality for defining a customized button display by letting a user select and/or define icons. The content name for the key display in 252 of FIGS. 5 and 6 in this embodiment is determined during preproduction of a show, such as from the name of a folder, directory, or file. It should be noted that using the selection of folder(s) and/or file(s) using menu button 562, selection of some or all of the files in one or more directories or folders may be performed.

As described above, creation of a show definition using the pre-production software may include: defining sources (as described, for example, in connection with FIG. 13), defining devices and associated content (as described, for example, in connection with FIG. 12), and identifying any plug-in devices (as described, for example, in connection with FIG. 12). It should be noted that an embodiment may provide for associating a device icon or other small image to be displayed in an area on the programmable keys. A predefined image selection may also be displayed such as, for example, in connection with a particular device type. An embodiment may also provide for displaying on a button a user-defined element such as, for example, a bitmap image created with another third-party software application. Other embodiments may use other interfaces and other techniques in connection with providing data for defining a show.

Once a show has been defined and created, such as using pre-production software, the show definition may be saved. For example, the show definition may be stored on a device of the workstation 20. At some later point, the show definition may be used in connection with a broadcast. The show definition may be used in defining initial and subsequent states of the control panel.

The data saved for a show definition may be in any one or more different formats and configurations, and may be stored in any one or more different data containers, such as in an XML file of a file system residing on the workstation. The organization and data container used may vary with each embodiment. It should be noted that content and format of XML files are known to those of ordinary skill in the art.

Figure 14:
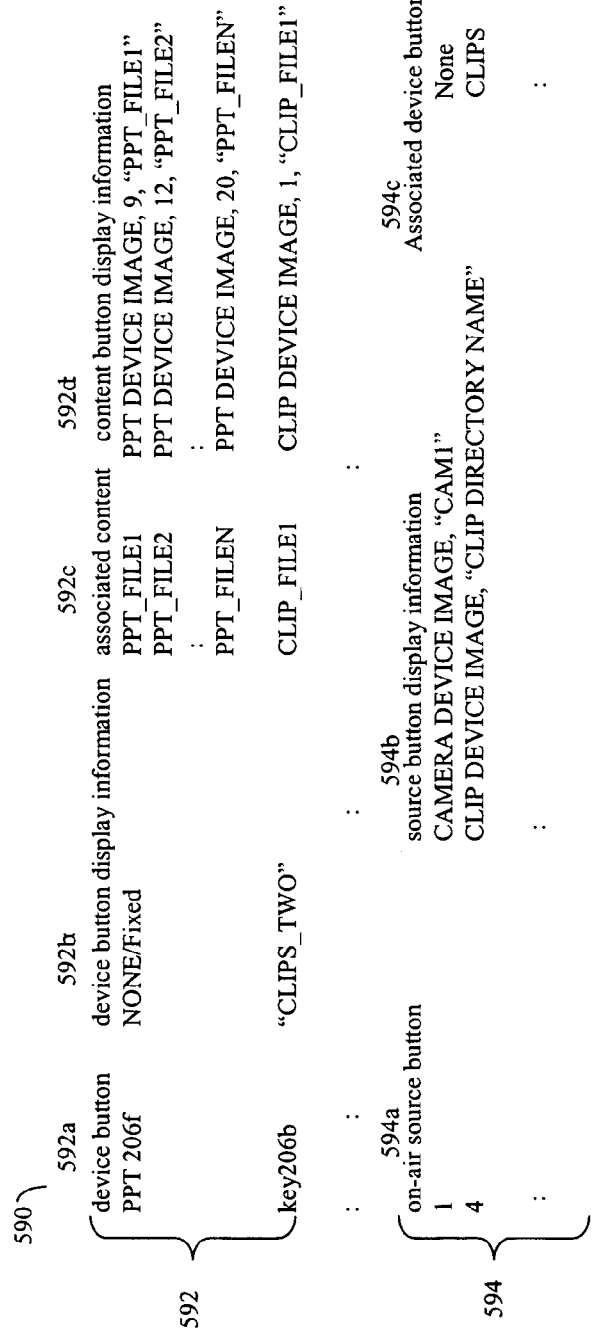
FIG. 14 is a representation of show definition data that may be included in an embodiment.

Referring now to FIG. 14, shown is one representation 590 of data that may be stored in connection with a show definition. The data of 590 may be stored in a file included in a file system of the workstation. Included in 590 may be the device button information 592 (for the device selection buttons of 206 of FIGS. 5 and 6) and source button information 594 (for the on-air source buttons 252 of FIGS. 5 and 6). In this example, the device button information may include one or more rows of data for each device defined. The device button information 592 may include device button data 592a, device button display information 592b, associated content 592c and content button display information 592d. The data in 592a may physically identify the particular button on a control panel being defined. The data in 592b may specify the text or other information to be displayed on the device button. Associated with each device button may be one or more occurrence of data in 592c and 592d, one for each content element. The data in 592c may specify the actual file name or other identifier as to where the particular content may be found during a broadcast when the show definition is used at a later time. The data in 592d may specify the display of each content button. For example, for the file PPT_FILE1, the corresponding content button is the numeric keypad position 1. The display of this content button includes a top portion with the PowerPoint device image, an associated numeric content identifier of "9", and the filename of the content "PPT_FILE1". The source button information 594 may include on-air source button data 594a, source button display information 594b, and an associated device button 594c. The data in 594a may identify the physical button on the control panel being defined (such as in area 252 of FIGS. 5 and 6). The data in 594b may specify the data to be displayed on the source button of 594a. In this example, a particular image or bitmap may be defined followed by a text string. The data in 594c may specify which device button is associated with this particular source.

It should be noted that the show definition data may include data other than as shown in 590 including, for example, show name and number data, particular functionality associated with controls in area 204 of FIGS. 5 and 6. For example, an embodiment may include definitions for plug-in or third party devices using data similar to that as included in 592.

A show definition may be loaded and used in connection with an on-line live broadcast. What will now be described is an example of a system using a previously created show definition.

Figure 15:
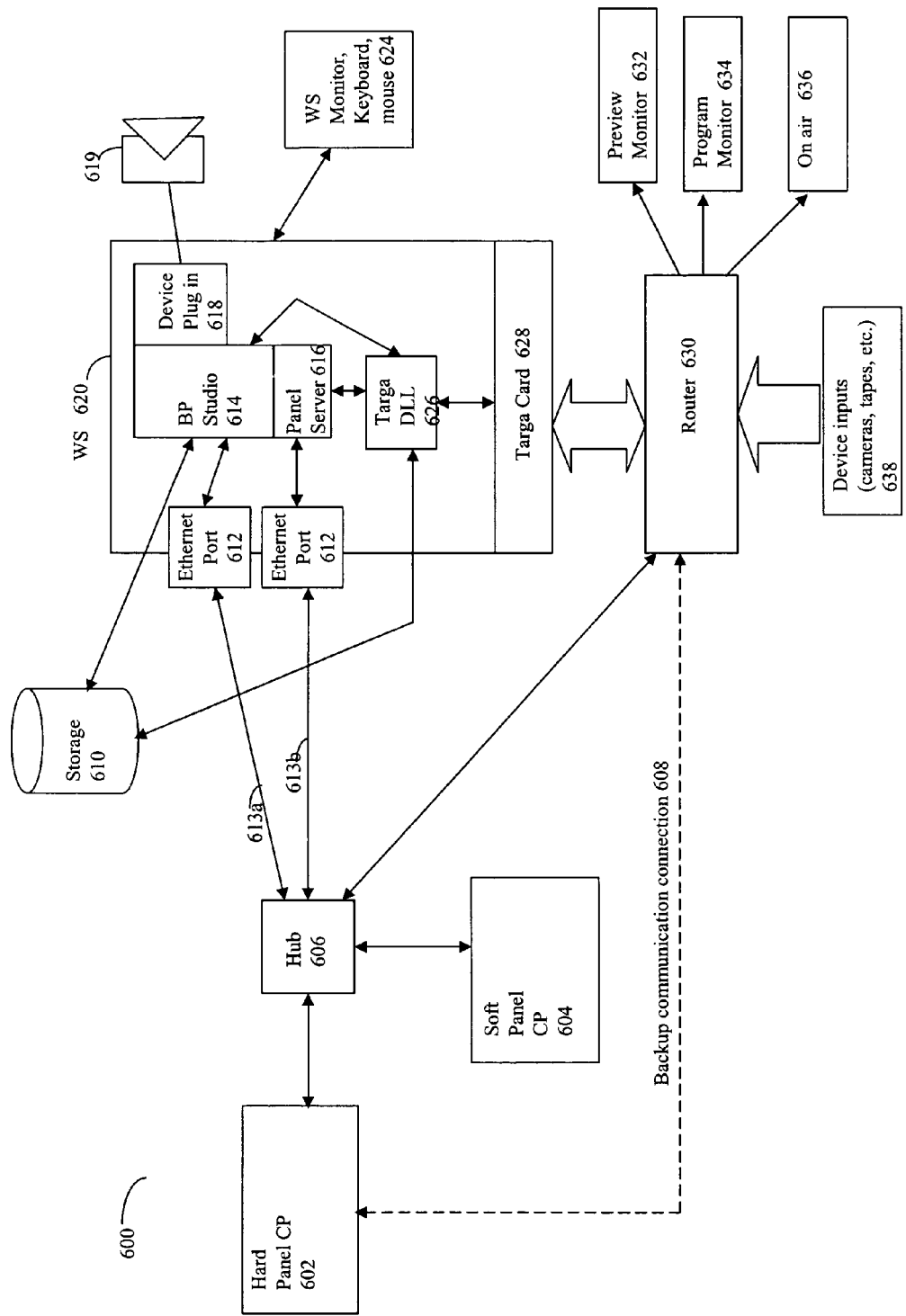
FIG. 15 is a more detailed example of components that may be included in an embodiment of a system of FIG. 1.

Referring now to FIG. 15, shown is an example 600 of components that may be included in a system used for performing a live broadcast. The example 600 includes more detail of each of the components control panel, workstation, router and devices described elsewhere herein. The example 600 includes a hard control panel 602 and a soft control panel 604 connected to a hub 606. The hub 606 is connected to the workstation 620 through an Ethernet port 612. The hub 606 is also connected to the router 630 for use in controlling various devices. In this example, the devices include the following output devices: previewer monitor 632, program monitor 634, and on-air output 636, and the input devices 638. The hard control panel 602 also has a backup communication connection 608 to the router 630 for controlling the devices in a live broadcast in the event that the workstation becomes unavailable during the broadcast. The use of the backup connection 608 provides an alternative means to control the devices used in the live broadcast.

The workstation 620 in this example 600 includes a BPStudio program 614, a panel server 616, a device plug-in 618, and a TARGA DLL 626. The workstation 620 has associated input and output devices 624 including, for example, a keyboard, mouse, and monitor that may be used in operation of the workstation 620. The panel server 616 communicates with the hard control panel and/or soft control panel using XML messages. The panel server 616 receives incoming XML messages and also transmits any outgoing XML messages exchanged with the control panels 602 and 604. In this embodiment, the hard control panel controls the operation of the show. The soft control panel 604 operates on a processor, such as included in a laptop, separate from the workstation 620. The BPStudio application 614 handles communications with the router 630 via the TARGA DLL 626 and TARGA Card 628. The TARGA DLL may include device interface routines for communicating with 628 and the router 630 in controlling the devices connected thereto. The device plug-in 618 may be used to communicate with the particular third party device 619 such as, for example, a device for controlling the pan and tilt of a camera, lighting, and the like. It should be noted that data transmissions may be sent between the workstation and the various devices connected to the router through the TARGA Card 628. Control commands to the router, as may be used in controlling which input sources are routed to which output sources, are sent through a second Ethernet port 612 to the hub 606 as indicated by 613a to the router 630. Different data stores, such as clip stores and the like, may be transmitted to the particular device on the router through the TARGA card 628.

The BPStudio application 614 performs the processing associated with controlling the show. At the beginning of a show, the application 614 reads the previously stored show definition data and communicates with the control panel(s). Data is sent to the control panels to initially set up the control panels for this particular show. The data may be communicated as one or more XML messages to define the control panels as described herein. The application 614 keeps track of the current configuration state of each control panel as well as other system-wide state information that affects the state of all control panels. Configuration state information of each control panel may include the particular control and associated state. For example, configuration state information for a control such as a knob in region 204 of FIGS. 5 and 6 may include a device identifier of the currently selected device associated with the controls, a knob identifier identifying the physical knob control on the control panel, and a numeric value indicating a setting of the knob such as an index associated with a content identifier. The application 614 also keeps track of other system-wide state information such as, for example, device state information with respect to the entire system. This device state information does not vary with each control panel. The device state information may indicate, for example, states about input and output devices of the system, such as which input source is currently transmitting data to what output source. The configuration state information and device state information for each control panel is managed by the application 614 during the show.

During the show, an operator may make selections from the hard control panel and/or soft control panel. These selections are communicated to the panel server 616 through 612 also in the form of XML messages identifying the particular control panel. The requested selection from a control panel may cause a change to state information for only the particular control panel. The requested selection may also cause a change to system-wide state information. In response to a message which affects only a single control panel's state information, only that control panel is updated. In response to a selection that changes the system-wide state information, all control panels are updated.

As an example of a message sent from a control panel which causes an update to only that control panel, consider the following. An XML message sent from the control panel to the workstation may identify the particular control and a new state as requested in accordance with a selection. The application 614 retrieves and updates the configuration state information of the respective control panel and communicates any new data back to the control panel. An operator on the control panel may make a new device selection in region 206, the application 614 returns in response the new state information to indicate the selected device key as active (e.g., a color change), and the new content display button data for buttons 222 in region 220.

The messages from a control panel may indicate a state change with respect to content to and/or from the devices connected to the router 630. This may be a system-wide state information change such as, for example, changing which content or input source is associated with the on-air output 636, program monitor 634, and/or previewer monitor 632. Such a request causes an update of the buttons on each control panel, for example, by changing appropriate button colorings to indicate the state change of on-air, preview, and the like. The application 614 controls these input and output sources by communicating with the router, device plug-ins, obtaining data from the data stores on storage device 610 (such as, for example, for clips, logos, and the like stored on the workstation's devices). In the event of a system-wide state change, the configuration data of all control panels may be updated, as maintained by BPStudio 614. Also, all control panels may have their displays updated in accordance with this system-wide change, such as selection of a new on-air or preview source, by the broadcasting of the control panel settings to all control panels from the workstation.

The foregoing describes operation of one configuration in which the hard control panel may be used to control the operation of the show over a primary Ethernet connection. In the event that the hard control panel 602 determines that the primary Ethernet connection and/or the workstation is otherwise unavailable, the backup connection 608 may be used to control operation of the devices connected to the router. Additional details of how an embodiment may determine that the workstation is off-line and re-establishing communications therewith when back on-line are described elsewhere herein.

It should be noted that, as described elsewhere herein, the workstation 620 may also be used in executing the pre-production software for generating a show definition. An embodiment may also include other software which provides for simulating the running or production of a show and other pre-production processing on another processor other than the workstation.

Figure 16:
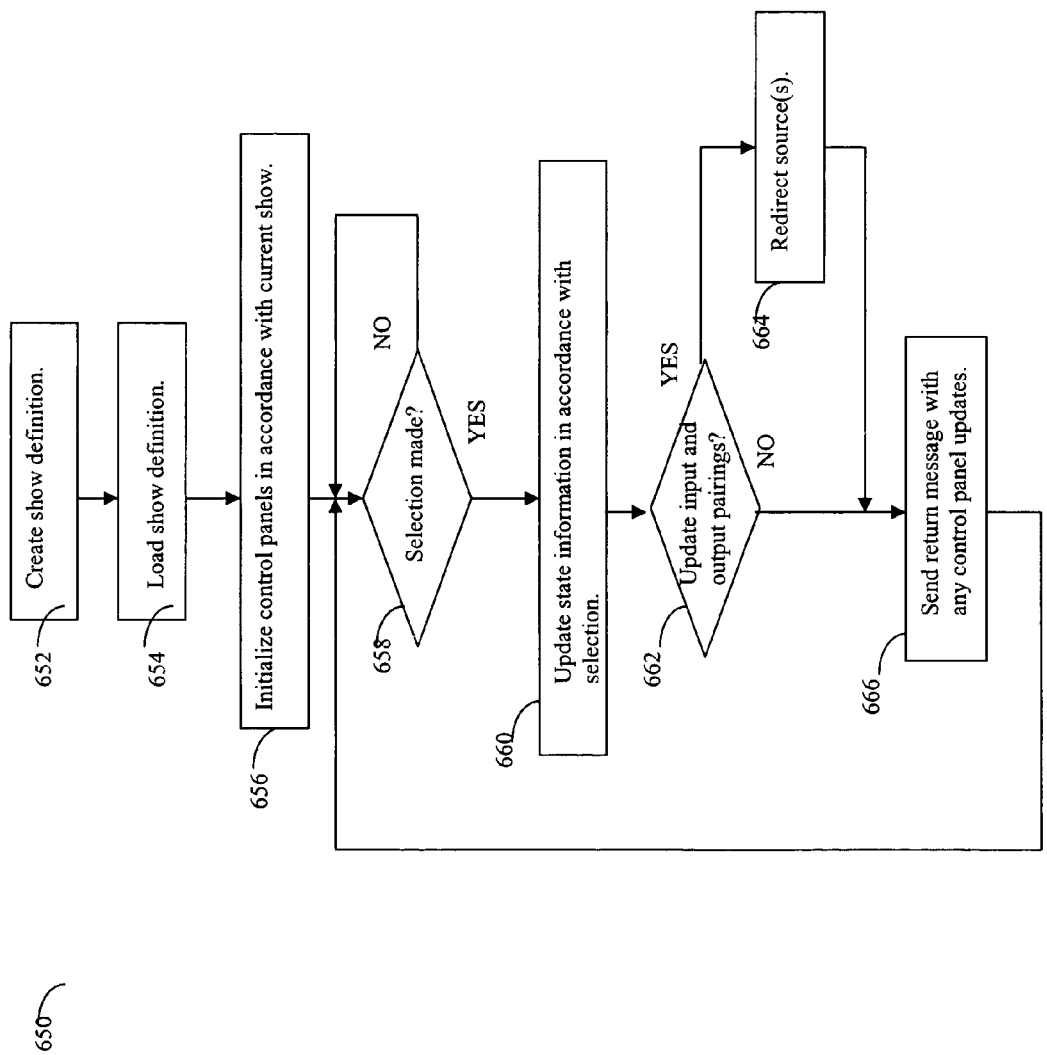
FIG. 16 is a flowchart of processing steps that may be performed using an embodiment of a system of FIG. 1.

Referring now to FIG. 16, shown is a flowchart 650 of processing steps that may be performed in one embodiment of a system 600. The steps of 650 summarize the general processing set forth above. At step 652, a show definition is created such as, for example, using the pre-production software. At some later point in time, the show definition may be used in a live broadcast. At step 654, the show definition is retrieved and loaded for use in the workstation, such as by application 614. At step 656, the one or more control panels are initialized in accordance with the current show definition. This may be performed by transmitting the appropriate messages to the control panel(s) from the workstation. At step 658, the workstation waits until it receives a message from one of the control panels indicating that a control panel selection has been made. In response, the workstation, at step 660, updates the appropriate state information for one or more control panels and/or system-wide state information. At step 662, a determination is made as to whether the selection affects the current input and output source pairings, such as the particular content currently on the air. If so, the source pairings may be adjusted such as, for example, by redirecting a different input source to the preview monitor or on-air monitor. This may be performed by sending the appropriate control signals to the router as described elsewhere herein. At step 666, the workstation sends the appropriate response message to the one or more control panels to update displays as needed in accordance with the previous selection determined at step 658. Control returns to step 658 where the workstation waits and processes the next control panel selection.

It should be noted that an embodiment as described herein may include multiple control panels. In the event that multiple control panels are included in an embodiment, certain portions of the control panel are always synchronized in accordance with selections made on one control panel that globally affect the state of the system and thus the other control panels. With reference to FIG. 5, the portions of the control panel that are always synchronized include, for example, the on-air source selection 252, preview source selection 256, and controls in the transition section 24, and 230. Additionally, an embodiment may include a mechanism providing for synchronization of remaining portions of all control panels that otherwise are not kept in lock step synchronization. This may be used, for example, when training an operator on a first control panel when a trainer is on another control panel. The synchronization option may be turned on/off during running of the actual show using a control option included in the workstation. The control panels are synchronized such that selection of a button on one causes the same selection of all controls to occur on another control panel.

The foregoing may be used in any one of more different configurations and applications. What will now be described are some examples of systems and applications that may use the components described herein.

Figure 17:
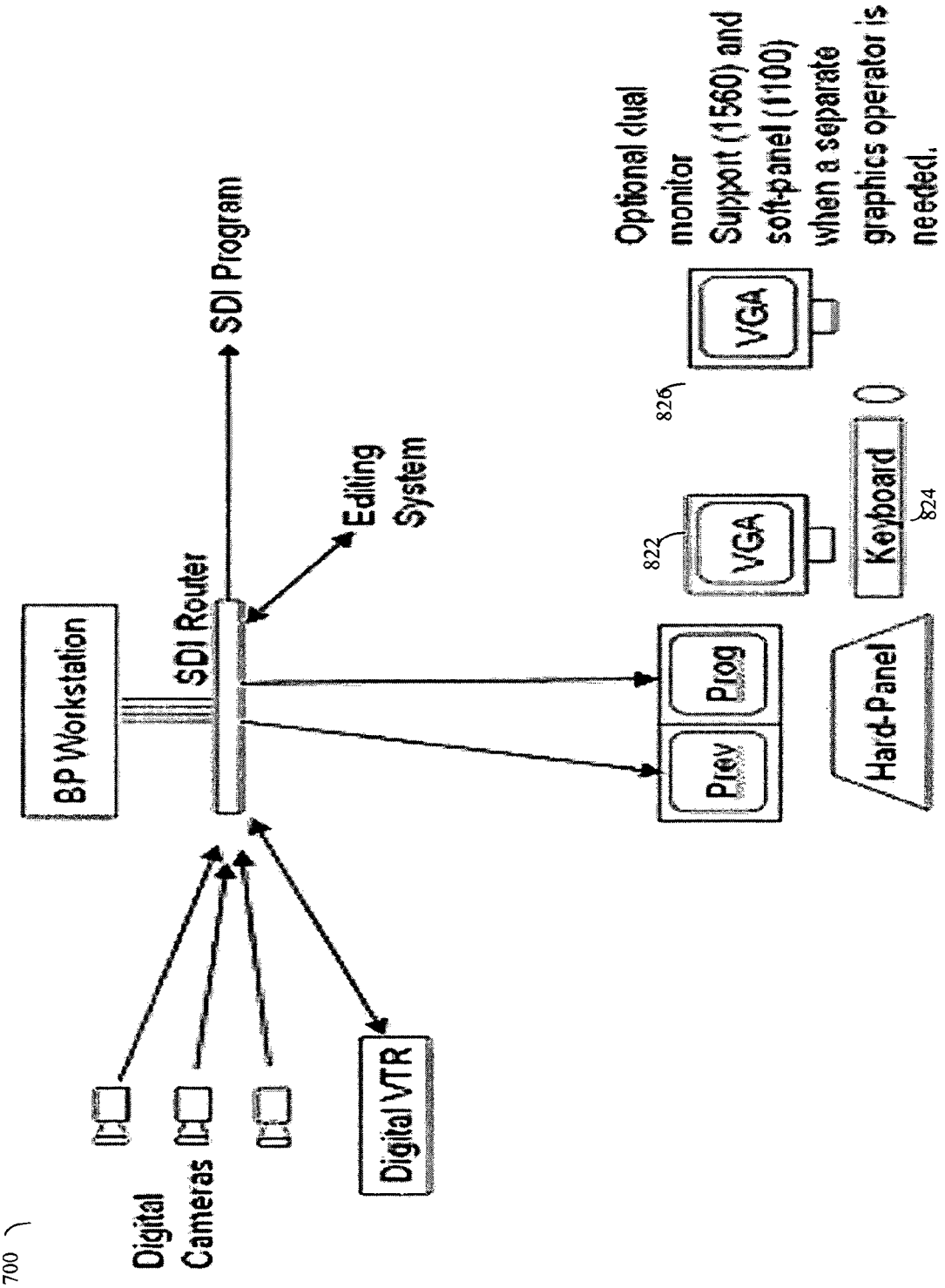
FIGS. 17-20 are examples of embodiments of the system described herein used in different applications.

Referring now to FIG. 17, shown is an example 700 of a system configuration. The system 700 may be a digital video studio including 3 cameras, a digital video tape recorder (VTR) and monitors. The router is connected to program and previewer monitors. With reference to this figure and others, not all connections are shown between all devices for the sake of simplicity. For example, the hard control panel is shown as not connected to anything. However, the hard control panel is actually connected to the workstation and router with the backup communication connection as described elsewhere herein. Similarly, the VGA monitor 822 and keyboard 824 are connected to the workstation. The VGA monitor 826 in this example includes a soft control panel and is connected to the workstation as described elsewhere herein.

In the example 700, each camera and the VTR plugs directly into the router. The router is also shown as being connected to an editing system for editing the different content sources. Shown is monitor 826 which in this example includes a soft control panel. A show may be produced with a single operator. However, a show may be more complex requiring a second operator that can sit at the soft control panel and manage one or more devices, such as graphics, on-air creation tasks, managing the title stores, still stores, logos and the like.

Figure 18:
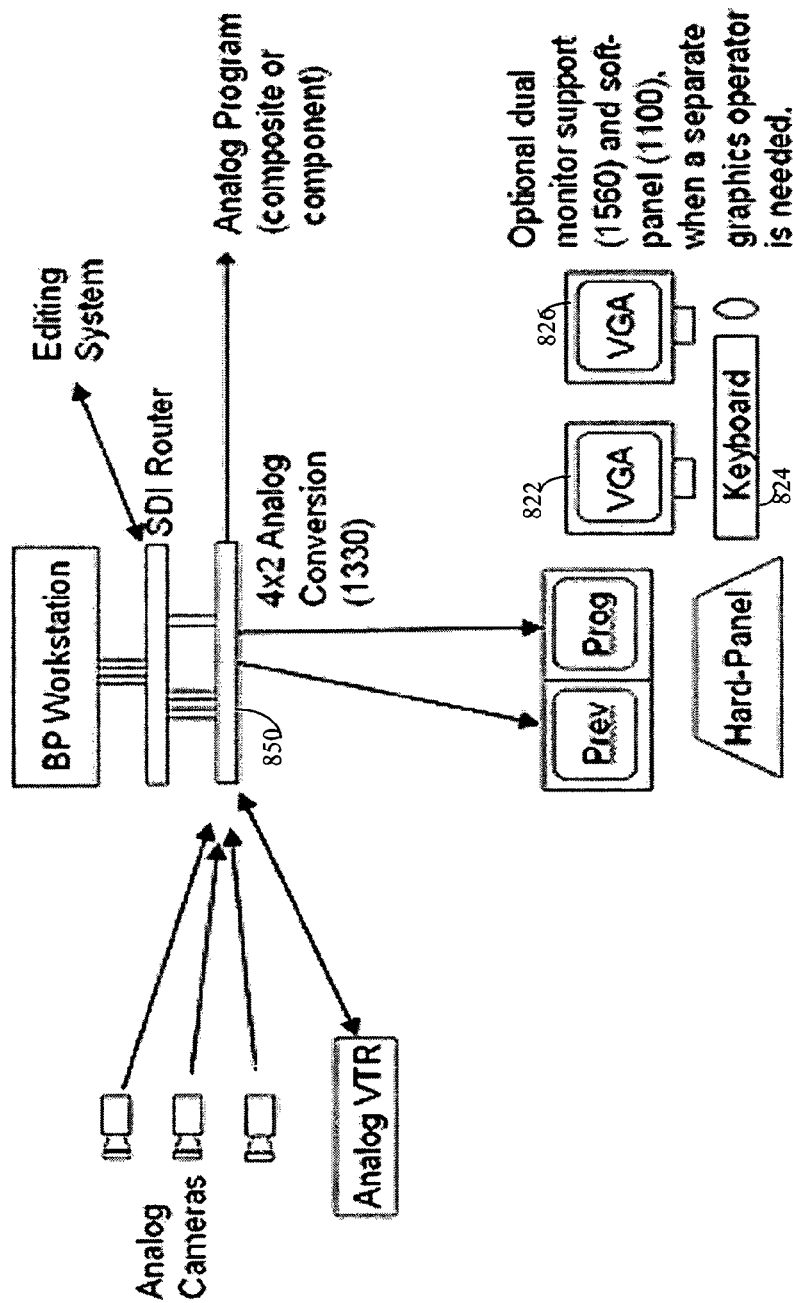

Referring now to FIG. 18, shown is an example 800 of another system configuration. In this example 800 with reference to the configuration of 700, there is an additional analog converter 850. The analog converter to perform A/D (analog to digital) and D/A (digital to analog) conversion as needed for the different components that may be included in the system for use with a digital router. This type of configuration may be used, for example, with older analog devices that may be used in a system.

Figure 19:
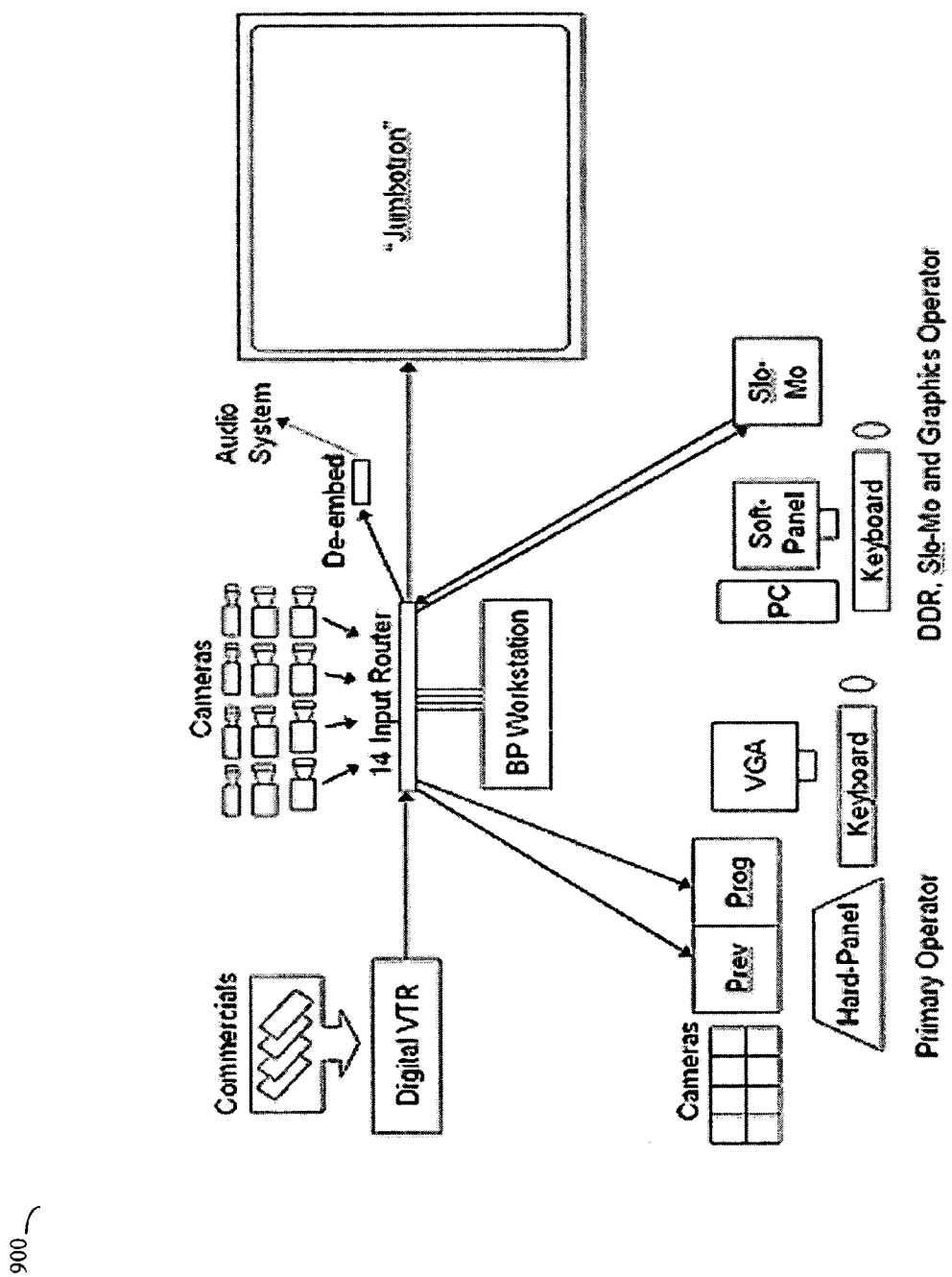

Referring now to FIG. 19, shown is an example 900 of another system configuration. In the example 900, the system may be used in connection with broadcasts such as, for example, with a jumbotron monitor for sporting events. The jumbotron monitor may be used to show game action to those in a stadium as well as instant replays, player shots, commercials during time outs, and the like. In this example 900, a larger 14 input router may be used for the many cameras. The system's hard control panel is used by the principle show operator. Two channels of still store are used, one for each team, as individual players are called up based on player numbers. An auxiliary camera output is sent to the slow motion (slo-mo) machine which is then fed back into the system. The hard control panel may then switch the slow motion to the jumbotron when desired. The slow-mo operator has a soft panel so that he may select the camera for slow motion input processing without disturbing the principle show operator. The slo-mo operator may also perform other functions, for example, such as control the digital recording and graphics. Commercials may be received on digital tape. Prior to the game, they are recorded onto the systems VTR along with embedded audio. The commercials may then be played out by when selected by the principle operator. A de-embedder may also be used to de-embed audio from a clip and send it to the stadium's audio system. The system's VTR may also be used to play sound effects, such as sounds played during content transitions, crowd motivating sounds, and the like.

Figure 20:
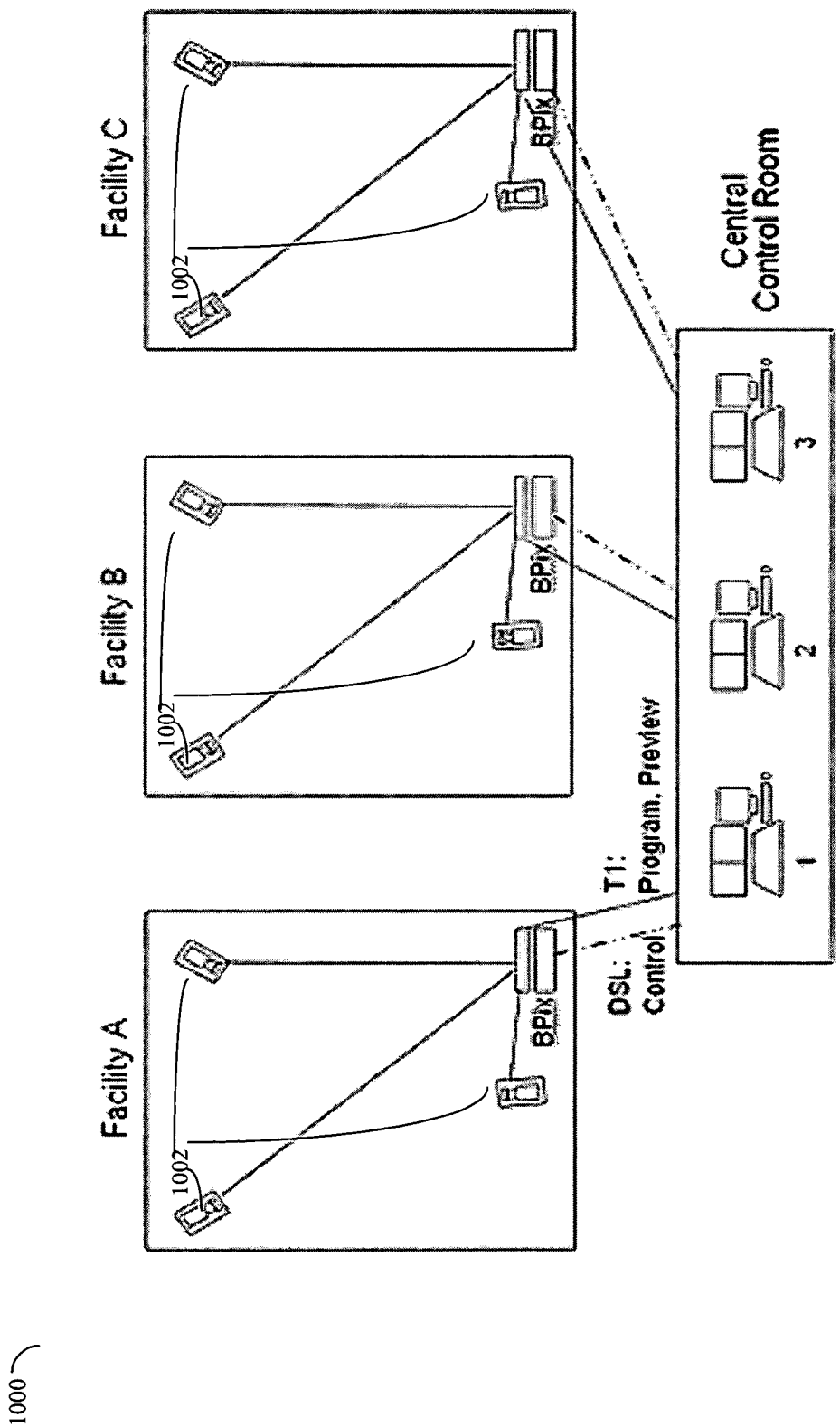

Referring now to FIG. 20, shown is an example 1000 of another system configuration. The example 1000 is a system that may be used in connection with 3 dispersed studios or facilities controlled from a single central control room. In this example 1000, each studio or facility includes a workstation and router. Control panel(s) and monitor(s) are located in the central control room. The control panels are connected to each studio by a DSL line. Each studio also has a dedicated T1 line to send video, for example, such as program and preview outputs. Each camera 1002 has remote control so the control room operators are able to remotely control each camera's position, focus, zoom, and the like. Use of the central control room in this embodiment may result in reduced staffing. The studios may be geographically dispersed across one major city or across the entire country. In this example, there may be hardware and/or software used to control the cameras and associated functions thereof.

The foregoing are just some example applications and configurations using the different techniques and components described herein.

It should be noted that the particular hardware and/or software described herein may be implemented using any one or more different techniques and/or components. For example, the pre-production software may be written in the C# (C-sharp) programming language and using Microsoft's .NET software tools and applications. The soft control panel may be a graphical user interface and may be implemented using Flash Player by Shock Wave running standalone or in a browser, such as Microsoft's Internet Explorer. Other embodiments may use other software to implement the techniques described herein.

It should also be noted that an embodiment may use other components in connection with fail-safe operation. Described herein is the use of multiple connections to control devices. Additionally, an embodiment may include, for example, redundant power supplies.

It should also be noted that an embodiment may combine functionality described herein illustrated in different components within a single component. For example, an embodiment may combine the functionality of the router 40 and workstation 30 in a single component. Additionally, functionality with the component may be implemented in hardware and/or software. For example, in the single component, some or all of the functionality associated with the router 40 may be implemented using software.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of controlling a show comprising:
sending messages between a control panel and a computer system over a primary communication connection to control one or more devices;
monitoring said primary communication connection to determine if said computer system is unavailable for communicating with said control panel; and
in response to determining that said computer system is unavailable, using a backup communication connection to control said one or more devices during said show, wherein said backup communication connection from said control panel is used to control said one or more devices without communicating with said computer system.

2. The method of claim 1, wherein said primary communication connection is independent from said backup connection.

3. The method of claim 1, wherein said computer system controls at least one of said one or more devices by communicating with a router to which said computer system and said at least one device is connected.

4. The method of claim 3, wherein said control panel is connected to said router using said backup communication connection.

5. The method of claim 1, wherein at least one of said one or more devices is directly connected to said computer system.

6. The method of claim 1, further comprising:
sending a message from said control panel to said computer system in response to a selection on said control panel.

7. The method of claim 6, further comprising, in response to receiving said message:
updating state information about said control panel; and
updating system status of a show.

8. The method of claim 7, wherein said state information includes at least one of: information local to said control panel, and information affecting a state of multiple control panels.

9. A method of controlling a show comprising:
sending messages between a control panel and a computer system over a primary communication connection to control one or more devices;
monitoring said primary communication connection to determine if said computer system is unavailable for communicating with said control panel; and
in response to determining that said computer system is unavailable, using a backup communication connection to control said one or more devices during said show, wherein said monitoring is performed by said control panel.

10. A method of controlling a show comprising:
sending messages between a control panel and a computer system over a primary communication connection to control one or more devices;
monitoring said primary communication connection to determine if said computer system is unavailable for communicating with said control panel;
in response to determining that said computer system is unavailable, using a backup communication connection to control said one or more devices during said show;
sending a message from said control panel to said computer system in response to a selection on said control panel; and
in response to receiving said message, updating state information about said control panel, and updating system status of a show, wherein said state information includes at least one of: information local to said control panel, and information affecting a state of multiple control panels, and wherein said multiple control panels include at least one hard control panel and at least one soft control panel having identical functionality.

11. A method of controlling a show comprising:
sending messages between a control panel and a computer system over a primary communication connection to control one or more devices;

monitoring said primary communication connection to determine if said computer system is unavailable for communicating with said control panel; and in response to determining that said computer system is unavailable, using a backup communication connection to control said one or more devices during said show, wherein said sending and said monitoring are performed during a show, and, prior to said sending and said monitoring, a configuration of at least one programmable button on said control panel is defined.

12. The method of claim 11, further comprising:

updating a display associated with said at least one programmable button in response to selection of another button of said control panel.

13. The method of claim 12, wherein updating said display includes displaying a filename of content associated with said at least one programmable button.

14. A method of controlling a show comprising:

sending messages between a control panel and a computer system over a primary communication connection to control one or more devices;

monitoring said primary communication connection to determine if said computer system is unavailable for communicating with said control panel; and in response to determining that said computer system is unavailable, using a backup communication connection to control said one or more devices during said show, wherein a transition is made of on-air content from a first source to a second source using an effect indicated on a transition effect button, said transition effect button including a display that varies in accordance with a current selection of one of a plurality a selected effect buttons.

15. A computer readable memory comprising code stored thereon for controlling a show, the computer readable medium comprising code that:

sends messages between a control panel and a computer system over a primary communication connection to control one or more devices;

monitors said primary communication connection to determine if said computer system is unavailable for communicating with said control panel; and in response to determining that said computer system is unavailable, uses a backup communication connection to control said one or more devices during said show, wherein said backup communication connection from said control panel is used to control said one or more devices without communicating with said computer system.

16. The computer readable memory of claim 15, wherein said code that monitors is included in said control panel.

17. The computer readable memory of claim 15, wherein said primary communication connection is independent from said backup connection.

18. The computer readable memory of claim 15, wherein said computer system controls at least one of said one or more devices by communicating with a router to which said computer system and said at least one device is connected.

19. The computer readable memory of claim 18, wherein said control panel is connected to said router using said backup communication connection.

20. The computer readable memory of claim 15, wherein at least one of said one or more devices is directly connected to said computer system.

21. The computer readable memory of claim 15, further comprising:

code that sends a message from said control panel to said computer system in response to a selection on said control panel.

22. The computer readable memory of claim 21, further comprising, code that, in response to receiving said message:

updates state information about said control panel; and updates system status of a show.

23. The computer readable memory of claim 22, wherein said state information includes at least one of: information local to said control panel, and information affecting a state of multiple control panels.

24. The computer readable memory of claim 23, wherein said multiple control panels include at least one hard control panel and at least one soft control panel having identical functionality.

25. The computer readable memory of claim 15, further comprising code that defines a configuration of at least one programmable button on said control panel, and wherein said code that defines is executed prior to said code that sends and monitors, said code that sends and monitors being executed during a show.

26. The computer readable memory of claim 25, further comprising:

code that updates a display associated with said at least one programmable button in response to selection of another button of said control panel.

27. The computer readable memory of claim 26, further comprising code that updates said display by displaying a filename of content associated with said at least one programmable button.

28. The computer readable memory of claim 15, wherein a transition is made of on-air content from a first source to a second source using an effect indicated on a transition effect button, said transition effect button including a display that varies in accordance with a current selection of one of a plurality a selected effect buttons.

* * * * *